US012689473B2

(12) United States Patent (10) Patent No.: US 12,689,473 B2
Panzner et al. (45) Date of Patent: Jul. 21, 2026

(54) HYBRID AUTOMATIC REPEAT REQUEST FEEDBACK FOR GROUPCAST

(71) Applicant: Nokia Technologies Oy, Espoo (FI)

(72) Inventors: Berthold Panzner, Munich (DE); Nuno Manuel Kiilerich Pratas, Aalborg (DK); Lianghai Ji, Aalborg (DK); Faranaz Sabouri-Sichani, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 306 days.

(21) Appl. No.: 18/262,857

(22) PCT Filed: Jan. 25, 2022

(86) PCT No.: PCT/EP2022/051536
§ 371 (c)(1),
(2) Date: Jul. 25, 2023

(87) PCT Pub. No.: WO2022/167256
PCT Pub. Date: Aug. 11, 2022

(65) Prior Publication Data
US 2024/0313906 A1 Sep. 19, 2024

(30) Foreign Application Priority Data

Feb. 8, 2021 (FI) ..................................... 20215130

(51) Int. Cl.
*H04L 1/1829* (2023.01)
*H04L 1/1812* (2023.01)
(52) U.S. Cl.
CPC .......... *H04L 1/1864* (2013.01); *H04L 1/1812* (2013.01)

(58) Field of Classification Search
CPC ................. H04L 1/1864; H04L 1/1812; H04L 2001/125; H04L 1/1854; H04L 2001/0093; H04L 1/1896; H04W 4/06; H04W 4/40; H04W 4/46; H04W 4/70
See application file for complete search history.

(56) References Cited

U.S. PATENT DOCUMENTS

| | | | |
|---|---|---|---|
| 10,064,212 B2 | 8/2018 | Faurie et al. | |
| 2019/0373427 A1 | 12/2019 | Park et al. | |
| 2020/0106566 A1* | 4/2020 | Yeo ...................... | H04L 1/1812 |
| 2020/0107170 A1* | 4/2020 | Chen .................... | H04W 72/23 |
| (Continued) | | | |

OTHER PUBLICATIONS

3GPP TSG RAN WG1 Meeting #104-e—Discussion on feasibility and benefits for mode 2 enhancements (R1-2101786), e-Meeting, Jan. 25-Feb. 5, 2021 (Year: 2021).*

(Continued)

*Primary Examiner* — Edan Orgad
*Assistant Examiner* — Malick A Sohrab
(74) *Attorney, Agent, or Firm* — Barta Jones, PLLC

(57) ABSTRACT

There is provided receiving, by a receiver wireless device, a groupcast, from a transmitter wireless device of the groupcast, determining by the receiver wireless device, at least one trigger for requesting to modify Hybrid Automatic Repeat Request, HARQ, feedback, transmitting, by the receiver wireless device to one or more peer receiver wireless devices of the groupcast, based on the determined at least one trigger, at least one request to modify the HARQ feedback to the groupcast.

20 Claims, 11 Drawing Sheets good link between UE-n and UE2 temporary bad link Ue1 - UE-n
e.g. due to blockage 502            504

(56)          References Cited

U.S. PATENT DOCUMENTS

| | | | | |
|---|---|---|---|---|
| 2020/0235868 | A1 | 7/2020 | Yu et al. | |
| 2020/0259600 | A1* | 8/2020 | Cao | H04L 1/0057 |
| 2020/0314832 | A1* | 10/2020 | Baghel | H04W 72/20 |
| 2020/0351032 | A1* | 11/2020 | Wu | H04W 72/56 |
| 2021/0021536 | A1* | 1/2021 | Ganesan | H04L 47/56 |
| 2022/0150730 | A1* | 5/2022 | Freda | H04L 1/1812 |
| 2022/0322327 | A1* | 10/2022 | Park | H04L 1/1854 |
| 2022/0330316 | A1* | 10/2022 | Lee | H04L 5/0055 |
| 2022/0377828 | A1* | 11/2022 | Wu | H04W 4/40 |

OTHER PUBLICATIONS

3GPP Tsg Ran WG1 Meeting #104-e - Discussion on feasibility and benefits for mode 2 enhancements (R1-2101786), e-Meeting, January 25th - Feb. 5, 2021 (Year: 2021).*

Notice of Allowance received for corresponding European Patent Application No. 22704738.8, dated Mar. 20, 2025, 8 pages.

"3rd Generation Partnership Project; Technical Specification Group Radio Access Network; NR; NR and NG-RAN Overall Description; Stage 2 (Release 18)", 3GPP TS 38.300 V18.5.0, Mar. 2025, pp. 1-271.

"3rd Generation Partnership Project; Technical Specification Group Radio Access Network; NR; Medium Access Control (MAC) protocol specification (Release 18)", 3GPP TS 38.321 V18.5.0, Mar. 2025, pp. 1-340.

"3rd Generation Partnership Project, Technical Specification Group Radio Access Network; NR; Physical layer procedures for control (Release 18)", 3GPP TS 38.213 V18.6.0, Mar. 2025, pp. 1-313.

"Considerations on Rel-19 Sidelink", 3GPP TSG RAN Meeting #101, RP-232066, CATT, Agenda item: 8A.2.12.5, Sep. 11-15, 2023, 5 pages.

Ganesan et al., "5G V2X Architecture and Radio Aspects", IEEE Conference on Standards for Communications and Networking (CSCN), Oct. 28-30, 2019, 6 pages.

"IEEE 802.11", Wikipedia, Retrieved on Aug. 1, 2023, Webpage available at : https://en.wikipedia.org/wiki/IEEE_802.11.

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

Office action received for corresponding Finnish Patent Application No. 20215130, dated Aug. 27, 2021, 9 pages.

Yu Lien et al., "3GPP NR sidelink transmissions toward 5G V2X", IEEE Access, vol. 8, Feb. 13, 2020, pp. 35368-35382.

International Search Report and Written Opinion received for corresponding Patent Cooperation Treaty Application No. PCT/EP2022/051536, dated May 3, 2022, 10 pages.

"Discussion on feasibility and benefits for mode 2 enhancements", 3GPP TSG RAN WG1 Meeting #104-e, R1-2101786, Agenda: 8.11.1.2, LG Electronics, Jan. 25-Feb. 5, 2021, 28 pages.

Office action received for corresponding Finnish Patent Application No. 20215130, dated Oct. 7, 2022, 3 pages.

* cited by examiner 602 receiving, by a receiver wireless device, a groupcast, from a transmitter wireless device of the groupcast 604 determining, by the receiver wireless device, at least one trigger for requesting one or more peer receiver wireless devices to modify a Hybrid Automatic Repeat Request, HARQ, feedback to the groupcast 606 transmitting, by the receiver wireless device to the one or more peer receiver wireless devices of the groupcast, based on the determined at least one trigger, at least one request to modify the HARQ feedback to the groupcast

Fig. 6

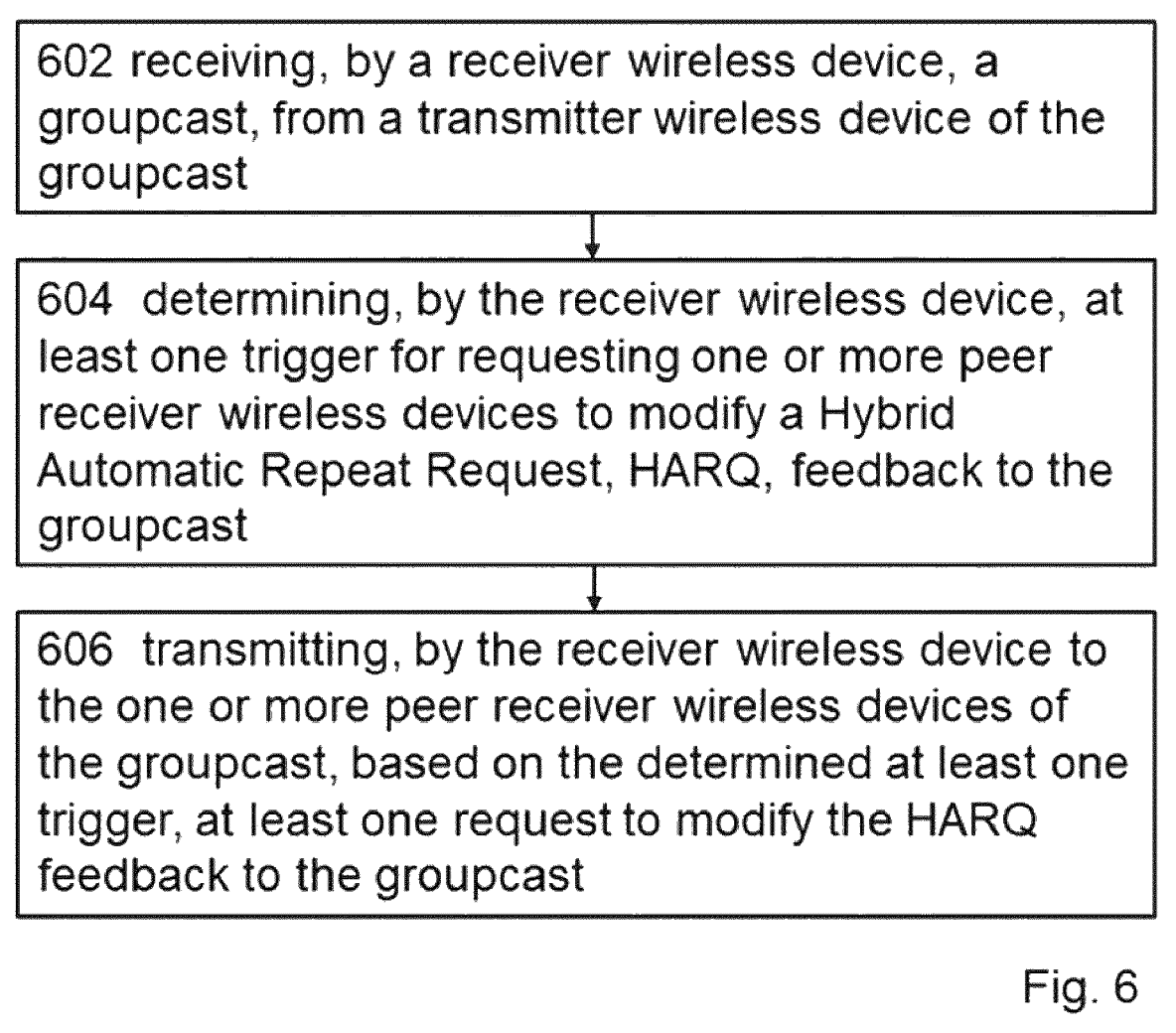

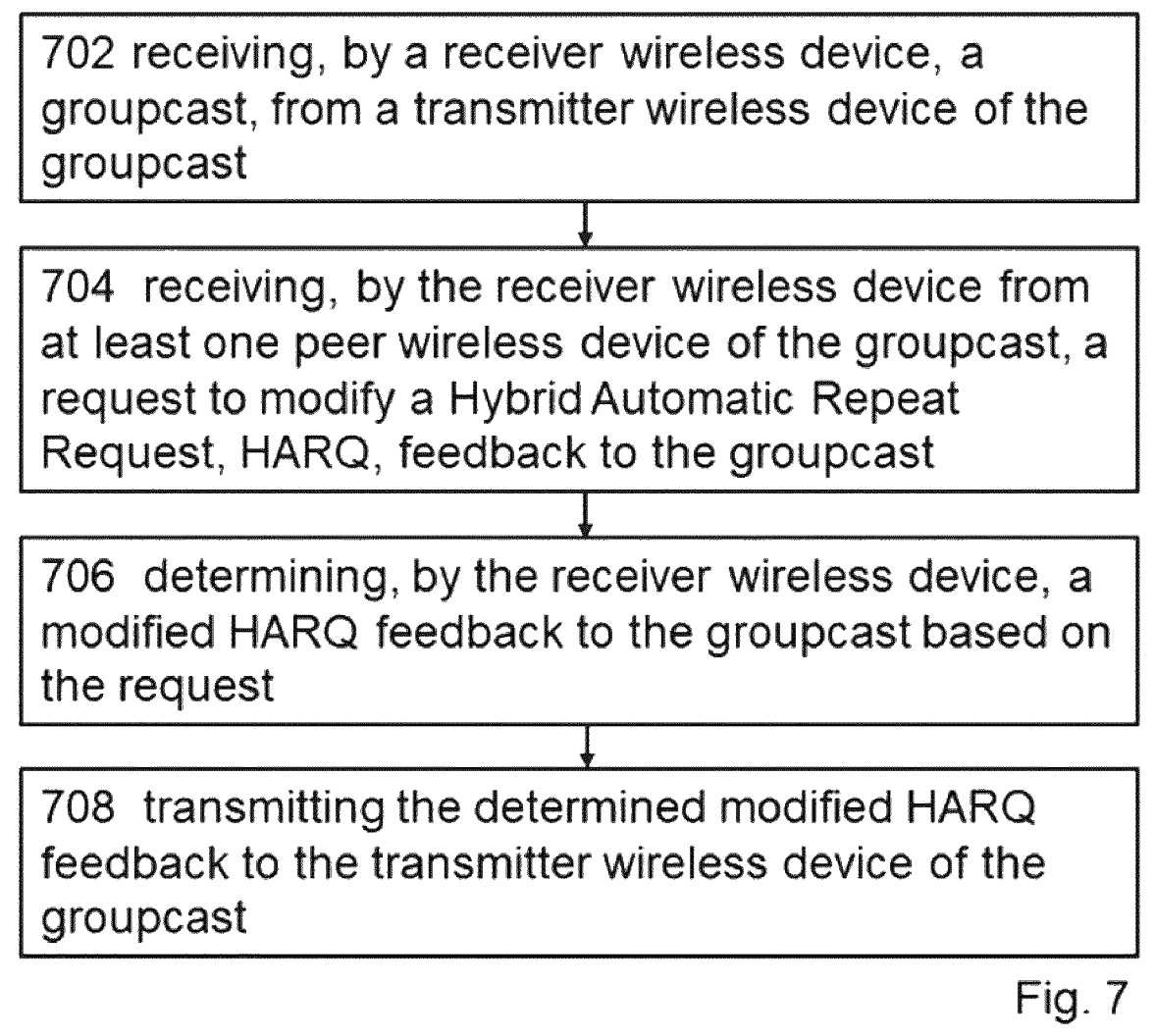

702 receiving, by a receiver wireless device, a groupcast, from a transmitter wireless device of the groupcast 704 receiving, by the receiver wireless device from at least one peer wireless device of the groupcast, a request to modify a Hybrid Automatic Repeat Request, HARQ, feedback to the groupcast 706 determining, by the receiver wireless device, a modified HARQ feedback to the groupcast based on the request 708 transmitting the determined modified HARQ feedback to the transmitter wireless device of the groupcast

Fig. 7

HYBRID AUTOMATIC REPEAT REQUEST FEEDBACK FOR GROUPCAST

RELATED APPLICATION

This application claims priority to PCT Application No. PCT/EP2022/051536, filed on Jan. 25, 2022, which claims priority from FI application Ser. No. 20215130, filed on Feb. 8, 2021, each of which is incorporated herein by reference in its entirety.

TECHNICAL FIELD

The present invention relates to Hybrid Automatic Repeat Request, HARQ, feedback for groupcast.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In vehicle-to-everything (V2X), vehicles may be equipped with user equipment configured to wirelessly communicate with other user equipment, such as vehicle-to-vehicle (V2V) user equipment, vehicle-to-network nodes (V2N), vehicle-to-pedestrian (V2P), and/or any other type of device. The V2X messages may be used to exchange messages, such as traffic related messages, alerts, autonomous or semi-autonomous driving messages, and/or any other type of data or message. For example, a V2X message may be sent from a first vehicle via a SideLink (SL) to other nearby vehicles warning the other vehicles of a hazardous traffic condition.

Group of User Equipment (UE) may be configured to receive a SL groupcast. However, radio conditions for receiving the groupcast may vary between members of the group, whereby reception of data and/or control information transmitted over the groupcast may not be successful at some of the UE of the group. Hybrid Automatic Repeat Request (HARQ) can be used to remedy unsuccessful groupcast transmissions. However, in order for the HARQ to operate, HARQ feedback should be sent from a receiver UE back to the transmitter UE in order for the transmitter UE to learn about any unsuccessful groupcast transmissions and determine if HARQ retransmissions are needed. However, if the radio conditions between the transmitter UE and the receiver UE are poor, HARQ feedback from the receiver UE may not be received at the transmitter UE. If the HARQ uses only negative acknowledgement (NACK) feedback such as in NR SL groupcast HARQ feedback option 1 (NACK-only), NACKs from the group members are the only feedback. In the NACK-only operation, poor radio conditions to a receiver UE can be left hidden from the transmitter UE.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect there is provided a method comprising:

receiving, by a receiver wireless device, a groupcast, from a transmitter wireless device of the groupcast;

determining by the receiver wireless device, at least one trigger for requesting one or more peer receiver wireless devices to modify a Hybrid Automatic Repeat Request, HARQ, feedback to the groupcast; and transmitting, by the receiver wireless device to the one or more peer receiver wireless devices of the groupcast, based on the determined at least one trigger, at least one request to modify the HARQ feedback to the groupcast.

According to a second aspect there is provided a method comprising:

receiving, by a receiver wireless device, a groupcast, from a transmitter wireless device of the groupcast;

receiving, by the receiver wireless device from at least one peer wireless device of the groupcast, a request to modify a Hybrid Automatic Repeat Request, HARQ, feedback to the groupcast;

determining, by the receiver wireless device, a modified HARQ feedback to the groupcast based on the request; and transmitting, by the receiver wireless device, the determined modified HARQ feedback to the transmitter wireless device of the groupcast.

According to a third aspect there is provided an apparatus comprising:

means for receiving, by a receiver wireless device, a groupcast, from a transmitter wireless device of the groupcast;

means for determining by the receiver wireless device, at least one trigger for requesting one or more peer receiver wireless devices to modify a Hybrid Automatic Repeat Request, HARQ, feedback to the groupcast; and means for transmitting, by the receiver wireless device to the one or more peer receiver wireless devices of the groupcast, based on the determined at least one trigger, at least one request to modify the HARQ feedback to the groupcast.

According to a fourth aspect there is provided an apparatus comprising:

means for receiving, by a receiver wireless device, a groupcast, from a transmitter wireless device of the groupcast;

means for receiving, by the receiver wireless device from at least one peer wireless device of the groupcast, a request to modify a Hybrid Automatic Repeat Request, HARQ, feedback to the groupcast;

means for determining, by the receiver wireless device, a modified HARQ feedback to the groupcast based on the request; and means for transmitting, by the receiver wireless device, the determined modified HARQ feedback to the transmitter wireless device of the groupcast.

According to a fifth aspect there is provided an apparatus comprising:

one or more processors, and memory storing instructions that, when executed by the one or more processors, the apparatus is caused to:

receive, by a receiver wireless device, a groupcast, from a transmitter wireless device of the groupcast;

determine, by the receiver wireless device, at least one trigger for requesting one or more peer receiver wireless devices to modify a Hybrid Automatic Repeat Request, HARQ, feedback to the groupcast; and

transmit, by the receiver wireless device to the one or more peer receiver wireless devices of the groupcast, based on the determined at least one trigger, at least one request to modify the HARQ feedback to the groupcast.

According to a sixth aspect there is provided an apparatus comprising:

one or more processors, and memory storing instructions that, when executed by the one or more processors, the apparatus is caused to:

receive, by a receiver wireless device, a groupcast, from a transmitter wireless device of the groupcast;

receive, by the receiver wireless device from at least one peer wireless device of the groupcast, a request to modify a Hybrid Automatic Repeat Request, HARQ, feedback to the groupcast;

determine a modified HARQ feedback to the groupcast based on the request; and transmit the determined modified HARQ feedback to the transmitter wireless device of the groupcast.

According to a seventh aspect there is provided computer program comprising computer readable program code means adapted to perform at least the following: receiving, by a receiver wireless device, a groupcast, from a transmitter wireless device of the groupcast;

determining, by the receiver wireless device, at least one trigger for requesting one or more peer receiver wireless devices to modify a Hybrid Automatic Repeat Request, HARQ, feedback to the groupcast; and transmitting, by the receiver wireless device to the one or more peer receiver wireless devices of the groupcast, based on the determined at least one trigger, at least one request to modify the HARQ feedback to the groupcast.

According to an eighth aspect there is provided computer program comprising computer readable program code means adapted to perform at least the following: receiving, by a receiver wireless device, a groupcast, from a transmitter wireless device of the groupcast;

receiving, by the receiver wireless device from at least one peer wireless device of the groupcast, a request to modify a Hybrid Automatic Repeat Request, HARQ, feedback to the groupcast;

determining, by the receiver wireless device, a modified HARQ feedback to the groupcast based on the request; and transmitting, by the receiver wireless device, the determined modified HARQ feedback to the transmitter wireless device of the groupcast.

According to a ninth aspect there is provided non-transitory computer readable medium comprising program instructions for causing an apparatus to perform at least the following:

receiving, by a receiver wireless device, a groupcast, from a transmitter wireless device of the groupcast;

determining, by the receiver wireless device, at least one trigger for requesting one or more peer receiver wireless devices to modify a Hybrid Automatic Repeat Request, HARQ, feedback to the groupcast; and transmitting, by the receiver wireless device to the one or more peer receiver wireless devices of the groupcast, based on the determined at least one trigger, at least one request to modify the HARQ feedback to the groupcast.

According to a tenth aspect there is provided non-transitory computer readable medium comprising program instructions for causing an apparatus to perform at least the following:

receiving, by a receiver wireless device, a groupcast, from a transmitter wireless device of the groupcast;

receiving, by the receiver wireless device from at least one peer wireless device of the groupcast, a request to modify a Hybrid Automatic Repeat Request, HARQ, feedback to the groupcast;

determining, by the receiver wireless device, a modified HARQ feedback to the groupcast based on the request; and transmitting, by the receiver wireless device, the determined modified HARQ feedback to the transmitter wireless device of the groupcast.

One or more of the above aspects may comprise at least some of the following features of the following list:

monitoring, by the receiver wireless device, one or more triggers for requesting to modify the HARQ feedback; and transmitting, by the receiver wireless device, the at least one request to modify the HARQ feedback to the groupcast based on detecting at least one trigger of the one or more triggers;

receiving, by the receiver wireless device, one or more responses to the at least one request, the one or more responses indicating acceptance to transmit modified HARQ feedback;

monitoring, by the receiver wireless device, HARQ feedback transmitted by the one or more peer wireless devices that have accepted to modify HARQ feedback;

determining, by the receiver wireless device, based on the monitoring if the HARQ feedback is transmitted by the one or more peer wireless devices that have accepted to transmit modified HARQ feedback; and reselecting, by the receiver wireless device, if the HARQ feedback is not determined to be transmitted, one or more further peer receiver wireless devices of the groupcast for transmitting modified HARQ feedback;

disabling, by the receiver wireless device, transmissions of modified HARQ feedback, based at least on an expiry of a timer for modified HARQ feedbacks, a number of modified HARQ feedbacks and/or improved radio conditions between the transmitter wireless device and the receiver wireless device;

the at least one request to modify the HARQ feedback to the groupcast comprises one or more information elements of a group comprising:

a number of consecutive modified HARQ feedbacks, sl-NrofFakeNACKs-rxx;

maximum number of accumulated modified HARQ feedbacks desired sl-MaxTotalNrofFakeNACKs-rXX;

a threshold for logical channel priority, sl-FakeNACK-priority-rxx;

flag for disabling or enabling modified HARQ feedback, sl-FakeNACK-rxx;

one or more link identifiers for transmitting modified HARQ feedback, sl-FakeNACKLinkIDList;

one or more identifiers of peer wireless devices for the request to modify HARQ feedback; sl-FakeNACK-peerUEIDList;

the groupcast is sidelink communications;

the at least one request to modify the HARQ feedback to the groupcast is a sidelink broadcast message, a sidelink groupcast message or a sidelink unicast message;

the HARQ feedback is NACK-only feedback;

the at least one request is a sidelink radio resource Control, RRC, protocol message or a sidelink Medium Access Control protocol, MAC, Control Element, CE;

the modified HARQ feedback is determined, by the receiver wireless device, based on determining a HARQ decision for the received groupcast and modi-
fying the determined HARQ decision;

disabling, by the receiver wireless device, transmissions
of the modified HARQ feedback, based on a request to
disable transmissions of the modified HARQ feedback
from said at least one peer wireless device and/or based
on one or more information elements of the request to
modify HARQ feedback to the groupcast.

At least some embodiments facilitate delivery of feedback
information for groupcast from a wireless device in case of
reception problems of the groupcast at the wireless device.

BRIEF DESCRIPTION OF THE DRAWINGS

For a more complete understanding of example embodi-
ments of the present invention, reference is now made to the
following descriptions taken in connection with the accom-
panying drawings in which:

FIGS. 6, 7 and 8 illustrate examples of methods in
accordance with at least some embodiments of the present
invention;

DETAILED DESCRIPTION OF SOME EXAMPLE EMBODIMENTS

Figure 1:
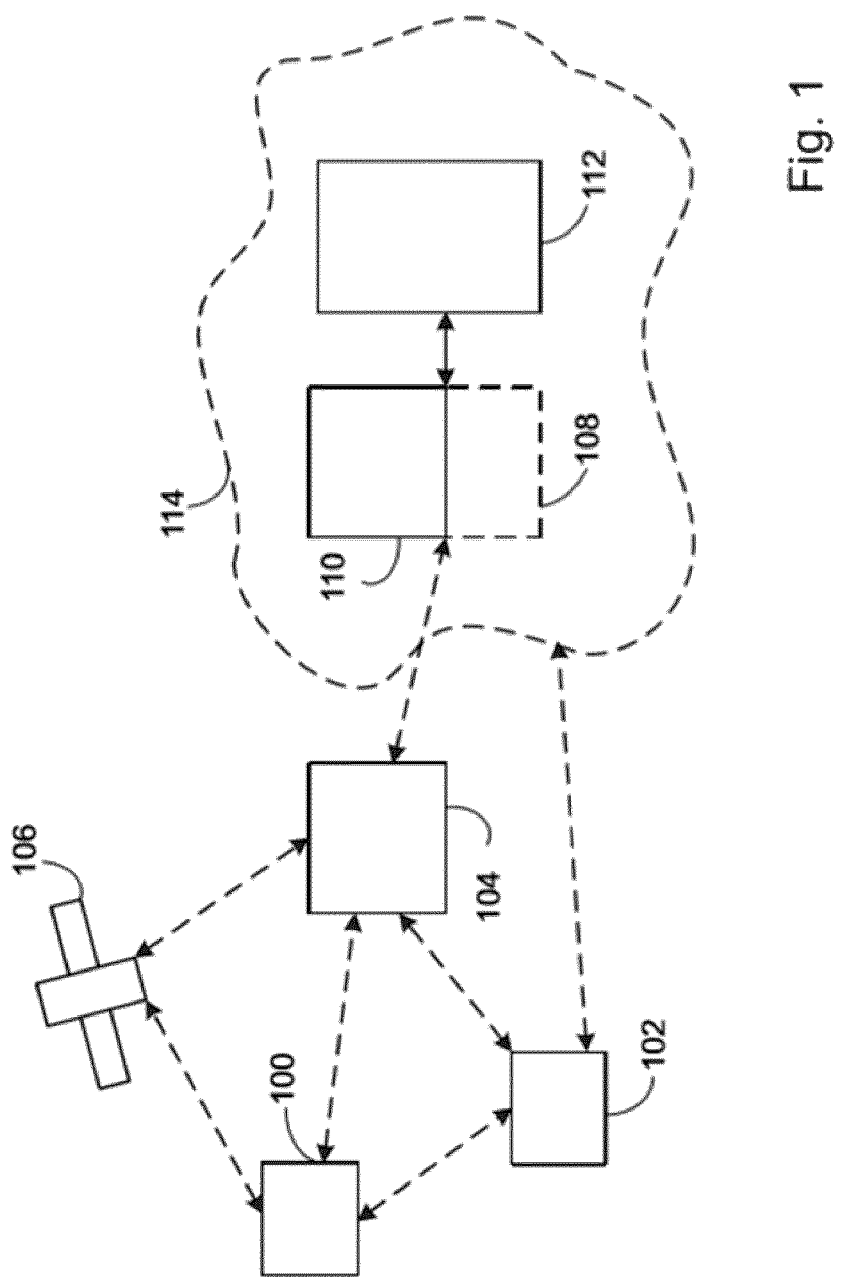
FIG. 1 shows a part of an exemplifying wireless commu-
nications access network in accordance with at least some
embodiments of the present invention.

The following embodiments are exemplary. Although the
specification may refer to "an", "one", or "some" embodi-
ment(s) in several locations, this does not necessarily mean
that each such reference is to the same embodiment(s), or
that the feature only applies to a single embodiment. Single
features of different embodiments may also be combined to
provide other embodiments.

Receiver wireless device may receive a groupcast from a
transmitter wireless device and determine at least one trigger
for requesting to modify Hybrid Automatic Repeat Request,
HARQ, feedback. The receiver wireless device may transmit
to one or more peer receiver wireless devices of the group-
cast, based on the determined at least one trigger, at least one
request to modify the HARQ feedback to the groupcast.
Provided the one or more peer receiver wireless devices
accept the request to modify the HARQ feedback, the
transmitter wireless device may receive HARQ feedback to
the groupcast even if HARQ feedback from the receiver wireless device would not be received at the transmitter
wireless device. Accordingly, the request to modify HARQ
feedback may cause that the peer wireless device generates
modified HARQ feedback and transmits the modified
HARQ feedback to the transmitter wireless devices. On the
other hand, if the HARQ feedback from the receiver wireless
device is received at the transmitter device, the one or more
peer receiver wireless devices transmit modified HARQ
feedback to the transmitter wireless device, whereby a
possibility of receiving HARQ feedback from the receiver
wireless devices at the transmitter wireless device may be
increased which is useful particularly for situations, where
one or more of the wireless devices may experience recep-
tion problems of the groupcast and for NACK-only HARQ-
feedback.

In the following, modified HARQ feedback may refer to
HARQ feedback to a groupcast. The groupcast may be
sidelink groupcast. HARQ feedback may be transmitted
from a receiver wireless device to a transmitter wireless
device based on an HARQ configuration. The modified
HARQ feedback may be generated, when the receiver
wireless device modifies HARQ feedback generated based
on the HARQ configuration or a modified HARQ configu-
ration used by the receiver wireless device. The modified
HARQ feedback may be generated based on a request from
another receiver wireless device. Examples of the HARQ
configurations comprise SideLink (SL) groupcast HARQ
feedback option 1 and SL groupcast HARQ feedback option
2 defined by release 16 of the 3GPP specifications. In the
HARQ feedback option 1, only NACK is transmitted as
HARQ feedback. In the HARQ feedback option 2, the
HARQ feedback may be ACK or NACK. It should be noted
that although some examples are described with reference to
HARQ feedback option 1, also other HARQ configurations
may be applied. Examples of the modified HARQ feedback
may comprise (but not limited to) a receiver wireless device
reversing its HARQ feedback decision from ACK into
NACK based on a request from at least one peer wireless
device and transmitting at least one NACK feedback,
instead of not transmitting any feedback for option 1, to the
transmitter wireless device based on the feedback configu-
ration provided by the request.

FIG. 1 depicts examples of simplified system architec-
tures only showing some elements and functional entities,
all being logical units, whose implementation may differ
from what is shown. The connections shown in FIG. 1 are
logical connections; the actual physical connections may be
different. It is apparent to a person skilled in the art that the
system typically comprises also other functions and struc-
tures than those shown in FIG. 1.

The embodiments are not, however, restricted to the
system given as an example but a person skilled in the art
may apply the solution to other communication systems
provided with necessary properties.

The example of FIG. 1 shows a part of an exemplifying
radio access network.

FIG. 1 shows user devices 100 and 102 configured to be
in a wireless connection on one or more communication
channels in a cell with an access node (such as (e/g)NodeB)
104 providing the cell. The physical link from a user device
to a (e/g)NodeB is called uplink or reverse link and the
physical link from the (e/g)NodeB to the user device is
called downlink or forward link. It should be appreciated
that (e/g)NodeBs or their functionalities may be imple-
mented by using any node, host, server or access point etc.
entity suitable for such a usage. The access node provides
access by way of communications of radio frequency (RF) signals and may be referred to a radio access node. It should be appreciated that the radio access network may comprise more than one access nodes, whereby a handover of a wireless connection of the user device from one cell of one access node, e.g. a source cell of a source access node, to another cell of another node, e.g. a target cell of a target access node, may be performed.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point, access node or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, wireless device, communications device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play"

(e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
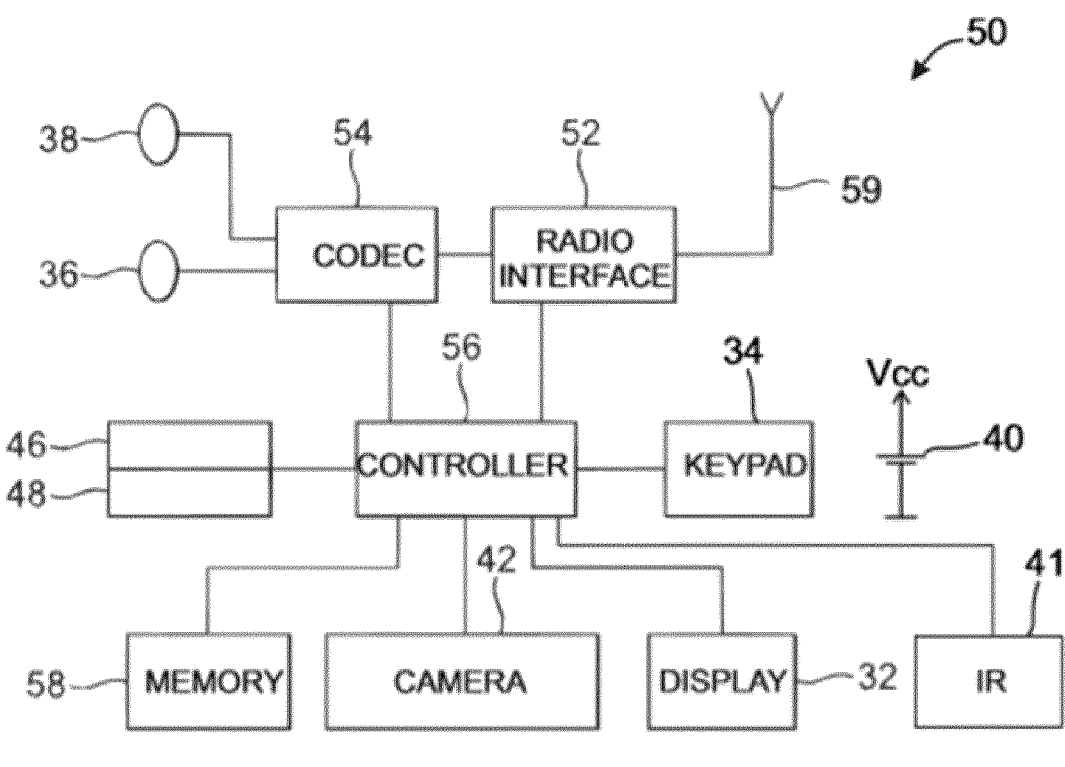
FIG. 2 shows a block diagram of an apparatus in accor-
dance with at least some embodiments of the present inven-
tion.
Figure 3:
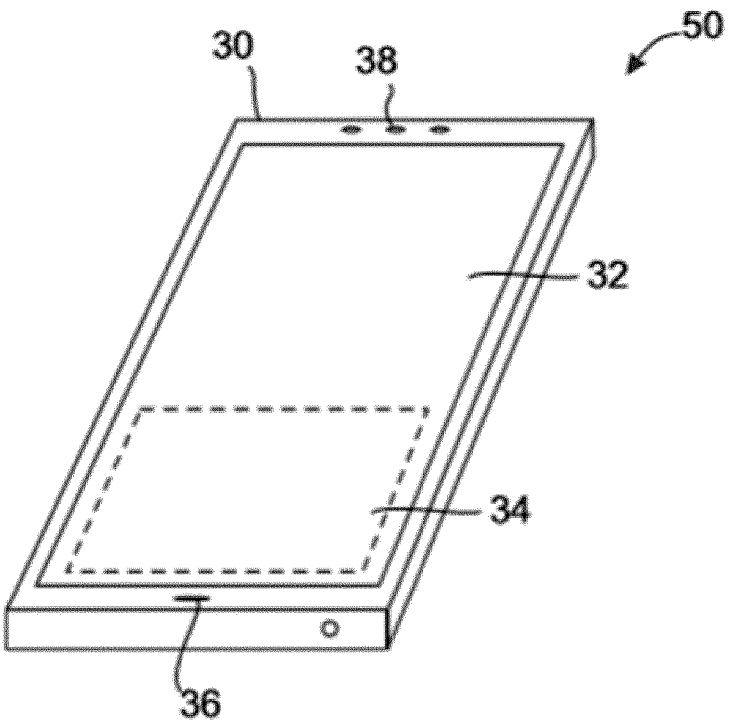
FIG. 3 shows an apparatus in accordance with at least
some embodiments of the present invention.

The following describes in further detail suitable apparatus and possible mechanisms for implementing some embodiments. In this regard reference is first made to FIG. 2 which shows a schematic block diagram of an exemplary apparatus or electronic device 50 depicted in FIG. 3, which may incorporate a transmitter according to an embodiment of the invention.

The electronic device 50 may for example be a communications device, wireless device, mobile terminal or user equipment of a wireless communication system. However, it would be appreciated that embodiments of the invention may be implemented within any electronic device or apparatus which may require transmission of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a universal integrated circuit card (UICC) reader and UICC for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network or a SL. The apparatus 50 may further comprise an antenna 59 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 42 capable of recording or detecting imaging.

Figure 4:
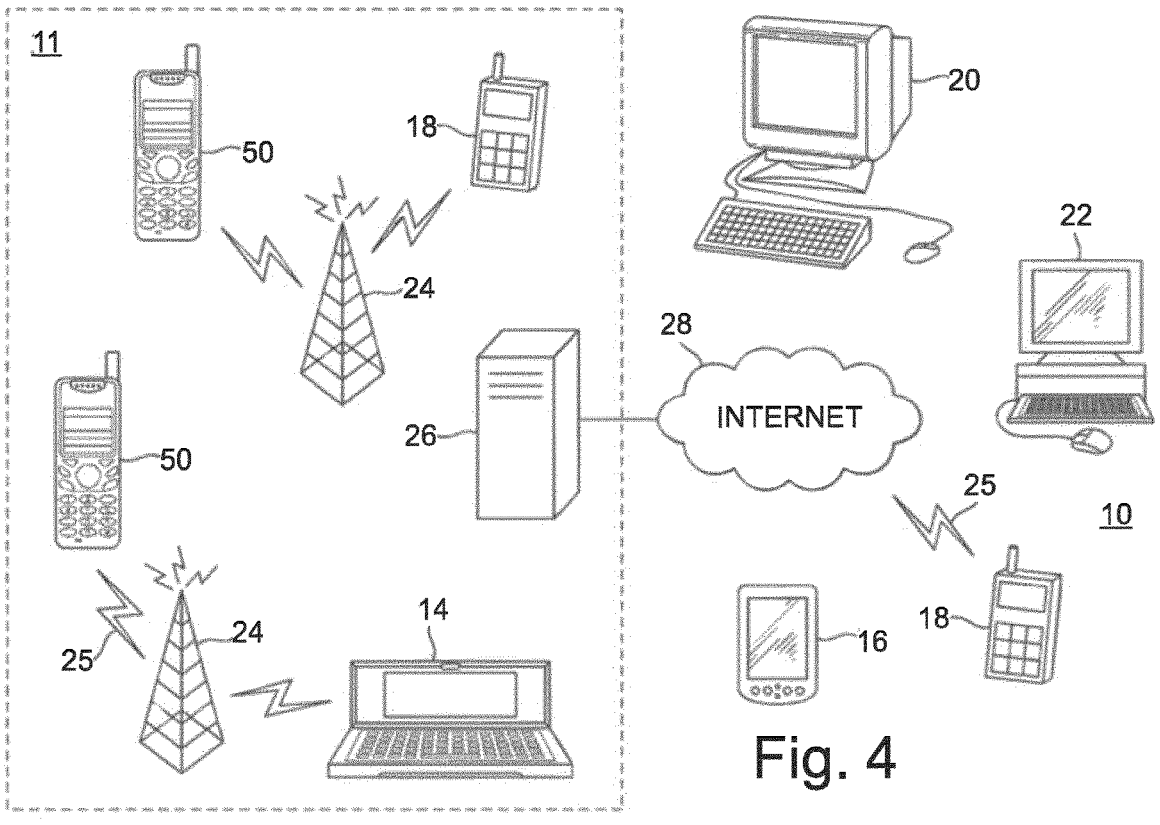
FIG. 4 shows an example of an arrangement for wireless
communications comprising a plurality of apparatuses, net-
works and network elements in accordance with at least
some embodiments of the present invention.

With respect to FIG. 4, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a GSM (2G, 3G, 4G, LTE, 5G), UMTS, CDMA network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 4 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE), 5G and any similar wireless communication technology. Yet some other possible transmission technologies to be mentioned here are high-speed downlink packet access (HSDPA), high-speed uplink packet access (HSUPA), LTE Advanced (LTE-A) carrier aggregation dual-carrier, and all multi-carrier technologies. A communications device involved in implementing various embodiments of the present invention may communicate using various media including, but not limited to, radio, infrared, laser, cable connections, and any suitable connection. In the following some example implementations of apparatuses utilizing the present invention will be described in more detail.

In an example in accordance with at least some embodiments the communications of the communications devices may comprise uplink transmissions, downlink transmissions and/or SL transmissions. The uplink transmissions may be performed from a wireless device to the wireless communication system, e.g. an access node, and the downlink transmissions may be performed from the wireless communication system, e.g. an access node, to the wireless device. The uplink transmissions may be performed on an uplink shared channel, e.g. a Physical Uplink Shared Channel (PUSCH). The PUSCH may be transmitted by the wireless device based on a grant received on a downlink control channel, e.g. a Physical Downlink control Channel (PDCCH). The downlink transmissions may be performed on a downlink shared channel, e.g. a Physical Downlink Shared Channel (PDSCH). Release 15 specifications of the 3GPP may be referred to for examples PUSCH and PDSCH procedures. SL may refer to the interface between UEs, or wireless devices, for Device-to-Device (D2D) communication and D2D discovery. The SL enables a direct communication between proximal wireless devices. PC5 is an example of a radio interface for SL and specified in 3 GPP LTE, Release 12 and beyond. Section 5.8. of the TS 38.331 describes SL procedures. Thus, in SL communications transmissions comprising data and/or control information do not need to go through the access network e.g. through an infrastructure node of the access network such as an eNB or a gNB. SL transmissions enable services that are often called "Proximity Services" (or ProSe) and the UEs supporting SL "ProSe'-enabled UEs. The channel defined/used by the SL may be a control channel or a data channel. A control channel that is used to broadcast basic system information for D2D communication may be the Physical SL Broadcast Channel (PSBCH). A control channel used for transmitting the D2D discovery signal may be defined as a Physical SL Discovery Channel (PSDCH). The D2D synchronization signal may be referred to as a SL Synchronization Signal (SLSS) or a D2D Synchronization Signal (D2DSS). A control channel for a SL groupcast, i.e. groupcast communications, may be a Physical SL Control Channel (PSCCH). A data channel for the SL groupcast may be a Physical SL Shared Channel (PSSCH).

SL communications may be broadcast, unicast or groupcast communications. The unicast communications may refer to transmissions from one UE to another UE, whereas the groupcast communications may refer to transmissions from one UE to a group of one or more UEs that are group members of the group, i.e. the groupcast group. In groupcast communications, a UE transmitting a groupcast transmission to the groupcast group may be referred to a transmitter UE (TX-UE) and a UE of the groupcast group receiving the groupcast transmission may be referred to a receiver UE (RX-UE). Unicast SL may refer to a SL for unicast transmission, or simply a unicast. A unicast transmission may comprise one or more unicast messages. Groupcast SL may refer to a SL for groupcast transmission, or simply a groupcast. A groupcast transmission may comprise one or more unicast messages.

Prior to performing a groupcast transmission, or a groupcast, the TX-UE transmits SL control information (SCI) on the PSCCH and PSSCH to the group members. The SCI comprises the information that enable the group members to receive and demodulate the upcoming groupcast transmission and a HARQ configuration for the groupcast transmission. The SCI comprises a $1^{st}$ stage on the PSCCH and a $2^{nd}$ stage that is multiplexed with data on the PSSCH. Therefore, the $1^{st}$ stage SCI is more robust against reception problems. The HARQ configuration is applied by the group members for transmitting HARQ feedback to the groupcast transmission. The HARQ configuration may comprise information indicating a HARQ option. The HARQ option may indicate resources for HARQ feedback and any conditions for transmitting HARQ feedback. In an example, a condition for the HARQ feedback may be that HARQ feedback may be an acknowledgement (ACK) or a negative acknowledgement (NACK), or the HARQ feedback may only be NACK, i.e. NACK-only. In release 16 of the 3GPP specifications, NR SL has developed SL groupcast transmission supporting HARQ feedback with two different options, SL groupcast HARQ feedback option 1 and SL groupcast HARQ feedback option 2. In option 1, all RX-UEs of a groupcast group use a common Physical SL Feedback Channel (PFSCH) resource to transmit NACK-only. The PSFCH resource is determined by RX-UEs in an implicit manner, by a mapping from the PSSCH resources and a source ID, i.e. the ID of TX-UE. For NR SL groupcast HARQ option 1 multiple receiving UEs launch PSFCH transmission on the same radio resource. In NR SL groupcast HARQ option 2, each Rx UE of a pre-defined group uses a dedicated PSFCH resource to transmit UE-specific ACK/NACK. If HARQ feedback is enabled in NR SL groupcast, each UE sends its HARQ feedback individually and irrespective of their neighbors' feedback.

Figure 5:
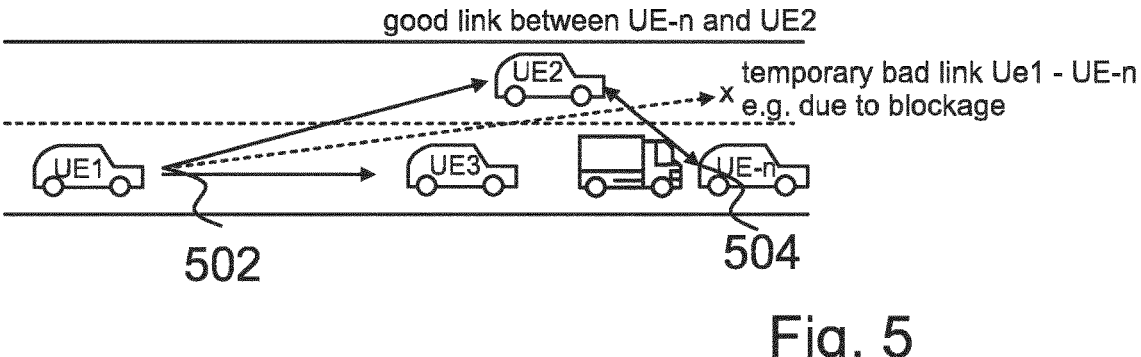
FIG. 5 illustrates an example scenario for modified
HARQ feedback for a groupcast in accordance with at least
some embodiments of the present invention.

FIG. 5 illustrates an example scenario for modified HARQ feedback for a groupcast in accordance with at least some embodiments of the present invention. User equipment, UE1, transmits a groupcast 502 to group members of a groupcast group. The groupcast may comprise periodical transmissions of groupcast messages from the UE1 to the group members. Accordingly, the UE1 may be referred to a transmitter UE (TX-UE) of the groupcast and the group members of the groupcast group may be referred to receiver UEs (RX-UEs). The groupcast may comprise HARQ feedback from the RX-UE to the TX-UE. The groupcast, and thereby the HARQ feedback, may be configured based on control information, SL control information (SCI), transmitted by the TX-UE to the RX-UE. SCI format 2-B may configure the group members to transmit NACK-only as HARQ feedback information using a common PSFCH resource. It should be noted that a groupcast group may comprise one or more group members. In this example, the group members of the group cast group comprise more than two RX-UE, i.e. UE2, UE3 and UE-n. In the example illustrated in FIG. 5, UE-n may determine at least one trigger for requesting a peer UE to modify HARQ feedback information. In an example, a trigger for requesting a peer UE to modify HARQ feedback information comprises that that UE-n fails to decode a 2nd stage SCI transmitted by the UE1, which causes that the UE-n cannot send a HARQ feedback, e.g. a NACK, to a groupcast message from UE1. In case the UE1 does not receive HARQ feedback from the UE-n, UE1 is unaware of problems experienced by the UE-n in receiving the groupcast. Consequently, the UE1 cannot take any actions to alleviate the problems experienced by the UE-n. Examples of the actions to alleviate the problems comprise at least one of sending one or more retransmissions of the groupcast, increasing a transmission power of the groupcast, selecting a modulation and coding scheme (MCS) with an improved robustness for the groupcast, adapting group member association and the impacted applications etc. Due to the lack of alleviating actions, the UE-n may fail to receive the groupcast from the UE1. Based on determining the at least one trigger for requesting a peer UE to modify HARQ feedback, the UE-n may request 504 one or more of the peer group members to modify HARQ feedback to the groupcast. The request may be referred to a SidelinkFakeHARQRequest message. When the one or more of the group members are caused to modify the HARQ feedback, the UE1 may receive the modified HARQ feedback even if HARQ feedback from UE-n would not be received by the UE1. The SidelinkFakeHARQRequest message may be, but is not limited to, a PC5-RRC message and/or a SL Medium Access Control (MAC) protocol control element (CE).

An example ASN.1 representation of the SidelinkFakeHARQRequest message may be:

```
-- ASN1START
-- TAG-SIDELINKFAKEHARQREQUEST-START
SidelinkFakeHARQRequest-rXX::= SEQUENCE {
            criticalExtensions CHOICE {
sidelinkFakeHARQRequest-rXX        SidelinkFakeHARQRequest-rXX-IEs,
criticalExtensionsFuture           SEQUENCE { }
            }
}
SidelinkFakeHARQRequest -rXX-IEs ::= SEQUENCE {
            sl-NrofFakeNACKs-rXX SEQUENCE (SIZE
(1..maxNrofConsecutiveFakeNACKs-rXX)) OF INTEGER
(1..maxNrofConsecutiveFakeNACKS-rXX)             OPTIONAL,
            sl-MaxTotalNrofFakeNACKs-rXX            SEQUENCE (SIZE (1..
maxNrofTotalFakeNACKs-rXX)) OF INTEGER (1..maxNrofTotalFakeNACKS-rXX)
            OPTIONAL,
            sl-FakeNACKpriority-rXX                 INTEGER (1...8)
            OPTIONAL,
            sl-FakeNACKLinkIDList-rXX               SL-FakeNACKLinkIDList-rXX
            OPTIONAL,
            sl-FakeNACKPeerUEIDList-rXX             SL-FakeNACKPeerUEIDList-rXX
            OPTIONAL,
            sl-FakeNACK-rXX        ENUMERATED {enabled, disabled}
            nonCriticalExtension    SEQUENCE { }          OPTIONAL
}
SL-FakeNACKIDList-rXX ::= SEQUENCE (SIZE (1..maxNrofFakeNACKLinkIDList-rXX))
OF INTEGER (1.. maxNrofFakeNACKLinkIDList-rXX)
SL-FakeNACKpeerUEIDList-rXX ::= SEQUENCE (SIZE
```

-continued

```
(1..maxNrofFakeNACKPeerUEIDList-rXX)) OF INTEGER (1..
maxNrofFakeNACKPeerUEIDList-rXX)
-- TAG- SIDELINKFAKEHARQREQUEST-STOP
-- ASN1STOP
```

It should be noted that one or more group members, peer RX-UE(s), of the groupcast group may respond to the request 504, SidelinkFakeHARQRequest message, with a SidelinkFakeHARQResponse message. The SidelinkFakeHARQResponse message may indicate the RX-UE to which extent the peer RX-UE can fulfil, or accept, the request 504. In an example, a SidelinkFakeHARQResponse message may be generated by a peer RX-UE based on modifying one or more information elements (IE) of the SidelinkFakeHARQRequest message received from the RX-UE. For example in the SidelinkFakeHARQResponse message the number of consecutive modified feedbacks may be reduced or the peer RX-UE may increase a priority level for which Logical Channel Priority the HARQ is allowed to be modified or the peer RX-UE may reject the request to modify its HARQ by setting sl-FakeNACK-rxx=disabled. Accordingly, an acceptance to transmit modified HARQ feedback may be indicated by sl-FakeNACK-rxx=enabled.

In an example in accordance with at least some embodiments, the SidelinkFakeHARQRequest message, the request to modify the HARQ feedback to the groupcast, comprises one or more information elements of a group comprising: a number of consecutive modified feedbacks per transport block, si-NrofFakeNACKs-rxx; sl-MaxTotalNrofFakeNACKs-rXX, a maximum number of accumulated modified feedbacks; a threshold for Logical Channel Priority, sl-FakeNACKpriority-rxx; flag for disabling or enabling modified HARQ feedback, sl-FakeNACK-rxx; one or more link identifiers for transmitting modified HARQ feedback, sl-FakeNACKLinkIDList; one or more identifiers of peer wireless devices for the request to modify HARQ feedback; sl-FakeNACKpeerUEIDList. In an example, the SidelinkFakeHARQRequest may be according to sidelink configuration defined in Section 5.8.9 of TS 38.331 V16.3.1 (2021-01) Radio Resource Control (RRC) protocol specification (Release 16) that is modified to include at least part of the following information elements:

sl-NrofFakeNACKs-rxx: Specifies a number of consecutive modified HARQ feedbacks per transport block desired by the requesting UE (e.g. UE-n in FIG. 5).

sl-MaxTotalNrofFakeNACKs-rXX: Specifies a maximum number of accumulated modified HARQ feedbacks desired by the requesting UE (e.g. UE-n in FIG. 5).

sl-FakeNACKpriority-rxx: Defines a threshold of SL Logical Channel Priority (LCP) for which the original HARQ feedback should be modified to ensure that the HARQ is modified only for high priority logical channels. An increasing priority number may indicate a lower priority level.

sl-FakeNACK-rxx: Flag to enable/disable the fake-NACKs.

sl-FakeNACKLinkIDList: Indicates the link identifier(s) where the peer RX UE(s) should perform transmit modified NACKs on behalf of UE-n. With this information, the peer RX UE(s) only modify NACK for the particular groupcast communication link(s) associated to the link identifier(s) included in the list.

sl-FakeNACKpeerUEIDList: Indicates the UE ID(s) to transmit modified NACKs. This IE may be needed to carry the ID(s) of the peer RX-UE(s), e.g. when the SCI associated to the SidelinkFakeHARQRequest message can not identify the peer RX-UE(s). As one example, the SidelinkFakeHARQRequest message may use the same group destination IDs in the SCI as the groupcast from UE1, but a peer RX-UE's ID is carried in this list.

It should be noted that the SidelinkFakeHARQResponse message may have the same information elements, e.g. the ASN.1 structure, as the SidelinkFakeHARQRequest message. In this way the peer RX UE (UE2) can generate the SidelinkFakeHARQResponse message to indicate to the requesting UE (UE-n) to which extend the peer RX UE can fulfil the request, i.e. the peer RX UE may reduce the number of consecutive modified NACKs or the peer UE may increase the priority level for which LCP the HARQ feedback is allowed to be modified or the peer UE rejects the request to modify its HARQ feedback by setting sl-FakeNACK-rxx=disabled (accordingly the acceptance to transmit modified HARQ feedback is sl-FakeNACK-rxx=enabled).

It should be noted that at least in some examples described herein, a request to at least one RX-UE to modify HARQ feedback may also be referred to a request to transmit modified HARQ feedback. For example, a request to modify HARQ feedback to a groupcast received by an RX-UE may cause the RX-UE to modify its HARQ decision for a groupcast message and the RX-UE to transmit the modified HARQ feedback as feedback to a TX-UE of the groupcast. In an example, a HARQ decision may be modified by reversing the HARQ decision. Reversing a HARQ decision may comprise reversing a positive HARQ decision into a negative HARQ decision or vice versa. In accordance with NR SL groupcast HARQ option 1, only NACK may be sent as HARQ feedback, i.e. NACK-only, whereby modifying a positive HARQ decision for a successfully received groupcast message may cause the RX-UE to transmit NACK. On the other hand, a HARQ decision for an unsuccessfully received groupcast message may cause the requested RX-UE to proceed transmitting HARQ feedback, e.g. NACK, because the NR SL groupcast HARQ option 1 is NACK-only. Accordingly, a HARQ feedback may be modified by enforcing a NACK HARQ feedback for SL groupcast option 1. In this way, the requested at least one RX-UE may be caused to transmit a NACK, regardless of whether the groupcast has been received successfully at the UE providing the HARQ feedback.

On the other hand, the request to the at least one RX-UE to modify HARQ feedback, or a request to transmit modified HARQ feedback, to a groupcast received by an RX-UE may cause the RX-UE to generate more than one HARQ feedback comprising a HARQ feedback based on HARQ configuration of the groupcast and a modified HARQ feedback a based on a modified HARQ configuration for the groupcast. For example, the generated HARQ feedback may comprise e.g. at least two HARQ feedback comprising one HARQ feedback based on NR SL groupcast HARQ option 1 and a further HARQ feedback based on a modified HARQ configuration. The modified HARQ configuration may be determined e.g. based on modifying the NR SL groupcast HARQ option 1. In an example, the NR SL groupcast HARQ option 1 may be modified by reversing a positive HARQ decision into a negative HARQ decision based on the NR SL groupcast HARQ option 1. In this way the at least one RX-UE may be caused to transmit NACK regardless of the HARQ decision, i.e. whether a reception of the groupcast is successful or unsuccessful. Thereby, if a HARQ decision in accordance with the NR SL groupcast HARQ option 1 is negative, the requested at least one RX-UE is caused to transmit NACK in accordance with the NR SL groupcast HARQ option 1. On the other hand, if a HARQ decision in accordance with the NR SL groupcast HARQ option 1 is positive, the modified HARQ feedback may obtained by reversing the positive HARQ decision and transmitting a NACK to TX-UE. In a further example, the NR SL groupcast HARQ option 1 may be modified by forcing a HARQ feedback to be NACK regardless of whether the groupcast has been received successfully by the requested at least one RX-UE.

It should be note that although the above examples are described using NR SL groupcast HARQ option 1, also they may be applied with other configurations as well.

Figure 8:
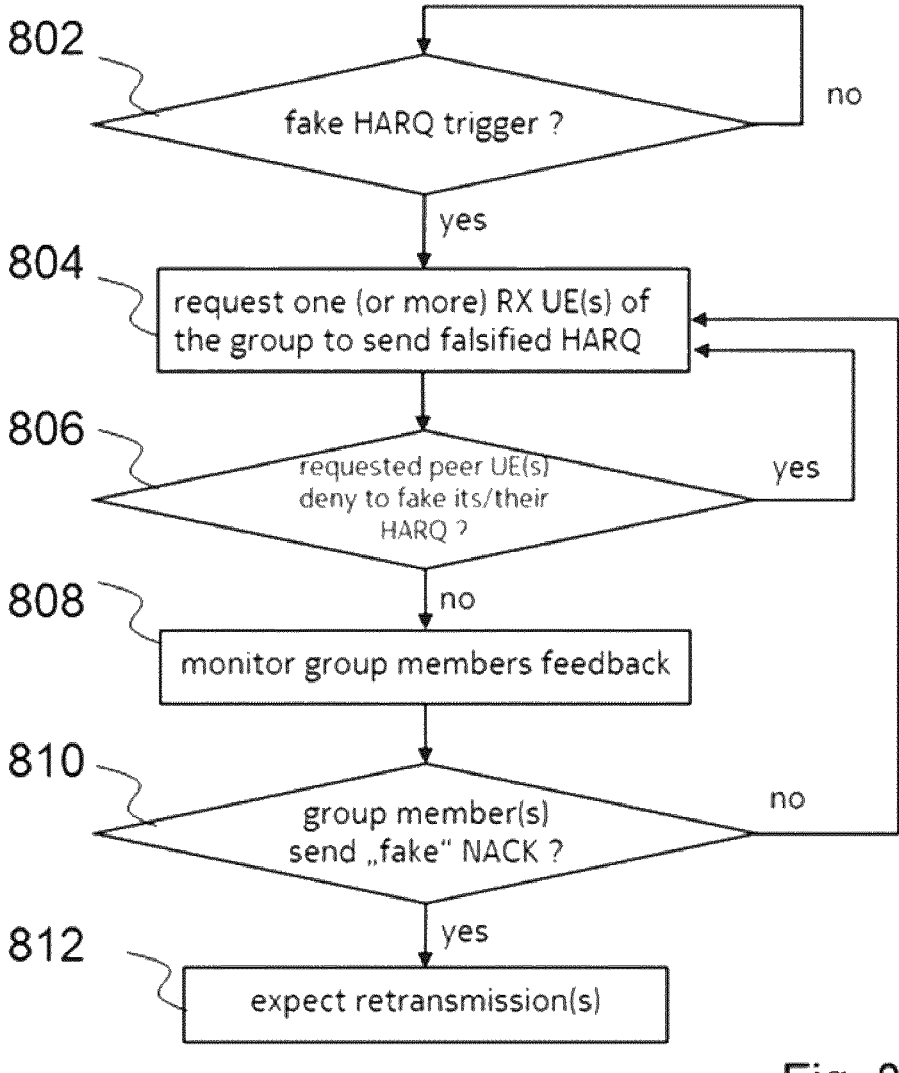

FIGS. 6, 7 and 8 illustrate examples of methods in accordance with at least some embodiments of the present invention. Referring to FIG. 6, the is provided a transmitter wireless device of a groupcast to receive HARQ feedback from a receiver wireless device in case of temporary reception problems of the groupcast at the wireless device. The HARQ feedback is provided with the help of one or more peer wireless devices that are requested by the receiver wireless device to modify HARQ feedback to the groupcast. The modification of the HARQ feedback is transparent to the transmitter wireless device, i.e. the transmitter wireless device is not aware if one or more receiver wireless devices have transmitted modified HARQ feedback.

Phase 602 comprises receiving, by a receiver wireless device, a groupcast, from a transmitter wireless device of the groupcast.

Phase 604 comprises determining, by the receiver wireless device, at least one trigger for requesting one or more peer receiver wireless devices to modify a Hybrid Automatic Repeat Request, HARQ, feedback to the groupcast.

Phase 606 comprises transmitting, by the receiver wireless device to the one or more peer receiver wireless devices of the groupcast, based on the determined at least one trigger, at least one request to modify the HARQ feedback to the groupcast.

In an example in accordance with at least some embodiments, the groupcast is an NR SL groupcast comprising SCI and data. SCI may comprise information indicating HARQ configuration. In an example the HARQ configuration may indicate SL groupcast HARQ feedback option 1 and periodic resources for the HARQ feedback.

In an example in accordance with at least some embodiments, the at least one request to modify the HARQ feedback to the groupcast is a sidelink broadcast message, a sidelink groupcast message or a sidelink unicast message.

Referring to FIG. 7, the is provided a transmitter wireless device of a groupcast to receive HARQ feedback in case of reception problems of the groupcast. The HARQ feedback is provided based on a request to modify HARQ feedback to the groupcast from a receiver wireless device that is a peer to another receiver wireless device that is encountering at least one trigger for requesting to modify HARQ feedback. The modification is transparent to the transmitter wireless device.

Phase 702 comprises receiving, by a receiver wireless device, a groupcast, from a transmitter wireless device of the groupcast.

Phase 704 comprises receiving, by the receiver wireless device from at least one peer wireless device of the groupcast, a request to modify a Hybrid Automatic Repeat Request, HARQ, feedback to the groupcast.

Phase 706 comprises determining a modified HARQ feedback based on the request.

Phase 708 comprises transmitting, by the receiver wireless device, the determined modified HARQ feedback to the transmitter wireless device of the groupcast.

Referring to FIG. 8, the is provided a method for modified HARQ feedback for a groupcast from a transmitter wireless device.

Phase 802 comprises the receiver wireless device monitoring one or more triggers for requesting to modify Hybrid Automatic Repeat Request, HARQ, feedback. If a trigger is determined based on the monitoring, the method may proceed to phase 804. If a trigger is not determined based on the monitoring, the monitoring may be continued in phase 802.

Phase 804 comprises by the receiver wireless device, requesting one or more peer wireless devices to modify HARQ feedback to the groupcast based on detecting at least one trigger of the one or more triggers. In other words the one or more peer wireless devices are requested to transmit modified HARQ feedback. In an example, phase 804 comprises the receiver wireless device selecting one or more peer wireless devices for transmitting modified HARQ feedback and the receiver wireless device transmitting the determined one or more peer wireless devices a request to modify HARQ feedback to the groupcast.

Phase 806 comprises the receiver wireless device determining whether the requested peer wireless devices have accepted to transmit modified HARQ feedback and if at least a part, or at least one, of the requested peer wireless devices have accepted to transmit modified HARQ feedback, the method may proceed to phase 808. In an example, in phase 806, the receiver wireless may determine based on one or more responses from the one or more peer wireless devices if the requested peer wireless devices have accepted to transmit modified HARQ feedback. If at least part of the one or more peer wireless, or all of the peer wireless devices, have rejected the request, the method may proceed to phase 804, where one or more further requests to modify HARQ feedback may be transmitted. The one or more further requests in phase 804 may be transmitted to one or more further peer wireless devices that may be (re-)selected.

Phase 808 comprises monitoring, by the wireless device, HARQ feedback transmitted by the one or more peer wireless devices that have accepted to transmit modified HARQ feedback. In an example, the wireless device may monitor a resource, where the one or more peer wireless devices should be transmitting the HARQ feedback. The resource may be determined based on a control information, e.g. SCI, transmitted by the transmitter wireless device, provided the control information may be at least partially received by the receiver wireless device. An example of the resource is a PFSCH that is indicated by SCI from TX-UE.

Phase 810 comprises, the receiver wireless device, determining based on the monitoring if the HARQ feedback is transmitted by the one or more peer wireless devices that have accepted to transmit modified HARQ feedback. The one or more peer wireless devices may comprise at least the one or more peer wireless devices that have not rejected the request, and therefore have accepted to transmit modified HARQ feedback. If the modified HARQ feedback is not determined to be transmitted, the method proceeds to phase 804. In an example, phase 810 may comprise that the modified HARQ feedback is not determined to be transmitted based on monitoring HARQ feedback transmissions from the one or more peer wireless device that have accepted to transmit modified HARQ feedback and the method proceeds to phase 804, where one or more further peer wireless devices may be reselected for transmitting modified HARQ feedback. In an example, phase 810 comprises that modified HARQ feedback is positively determined based on monitoring HARQ feedback transmissions from the one or more peer wireless device that have not rejected the request and the method proceeds to phase 812. Phase 812 may comprise expecting HARQ retransmissions by the transmitter wireless device.

Figure 9:
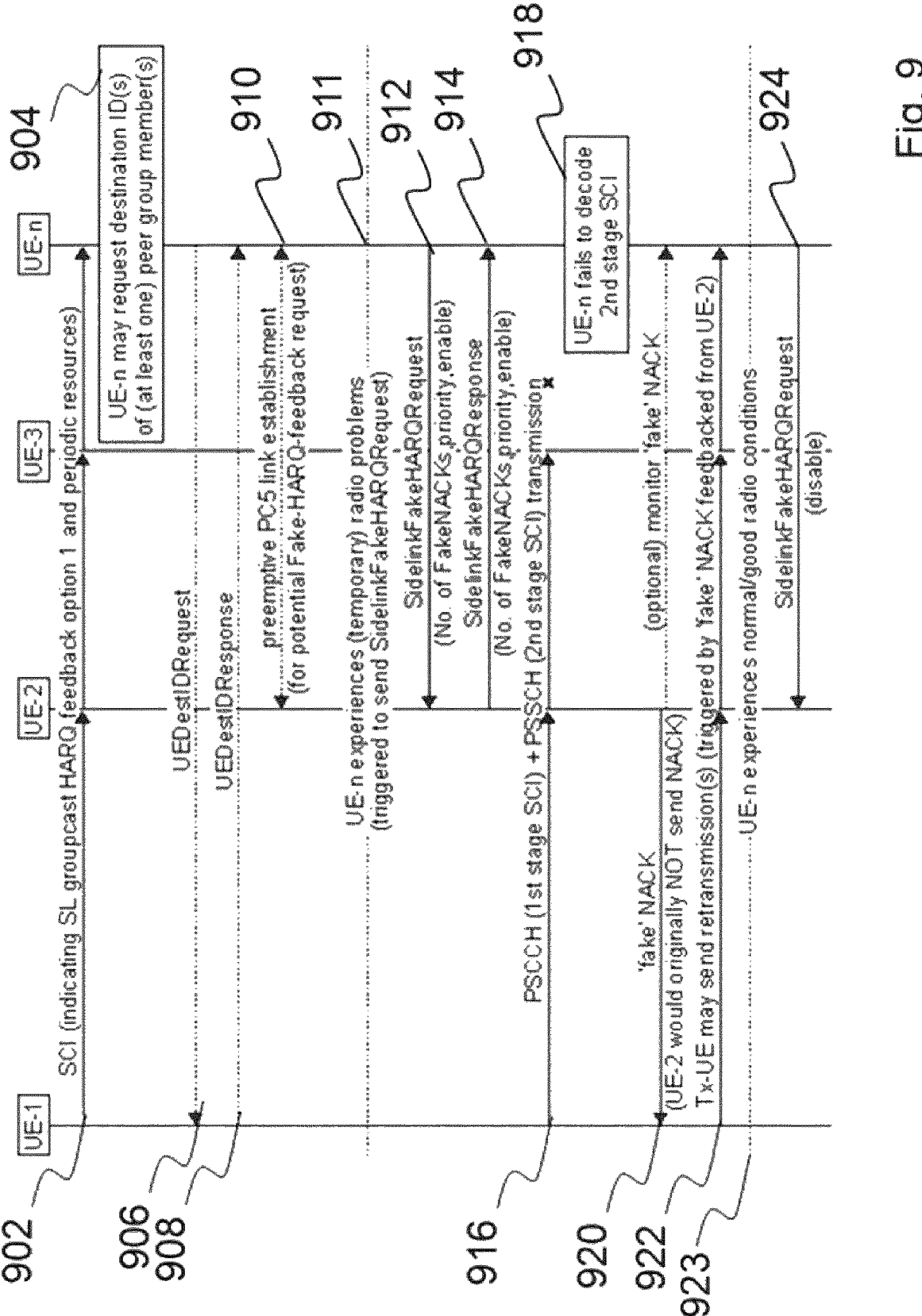
FIGS. 9, 10 and 11 illustrate examples of sequences for
modified HARQ feedback in accordance with at least some
embodiments of the present invention.
Figure 10:
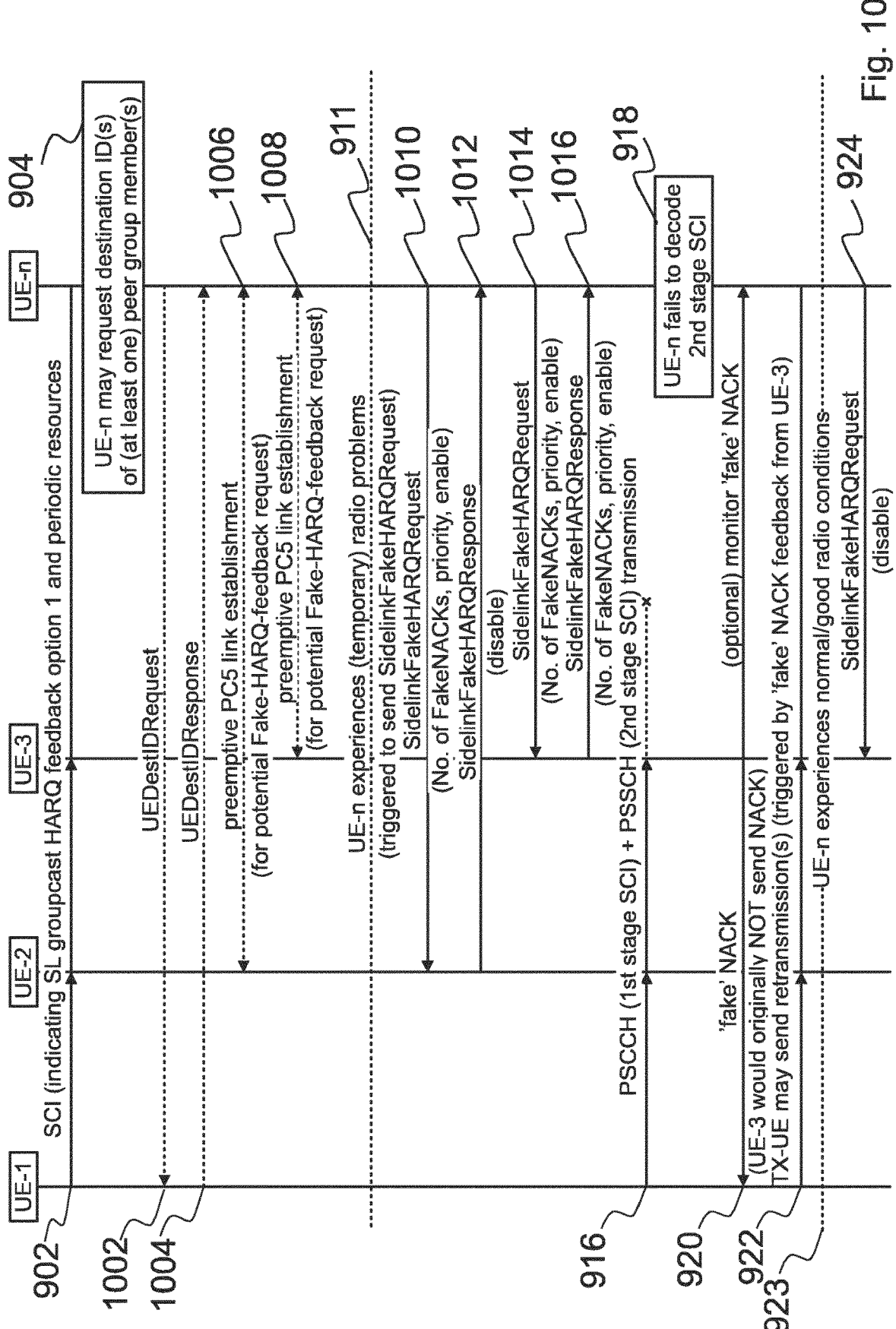
Figure 11:
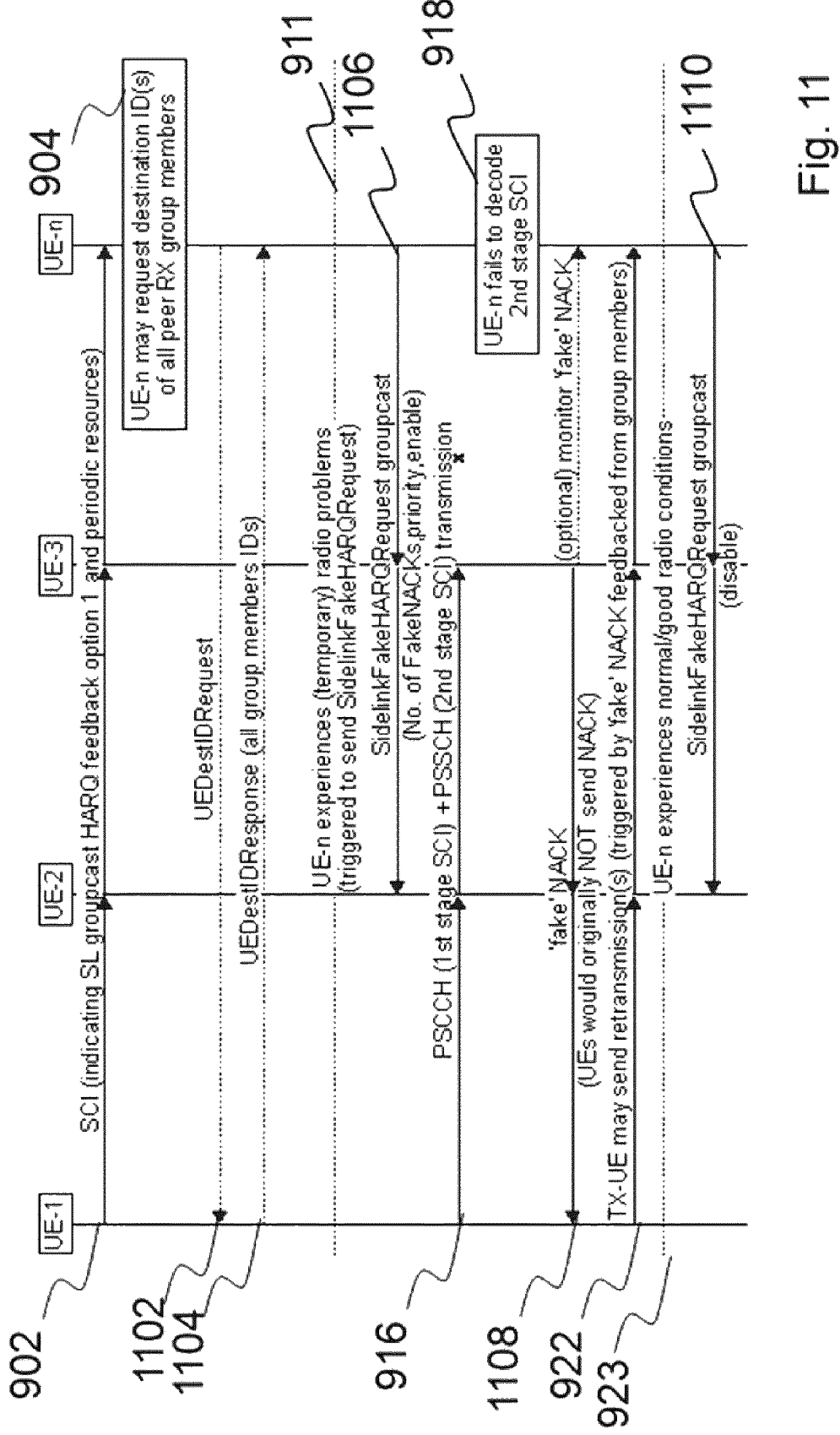

FIGS. 9, 10 and 11 illustrate examples of sequences for modified HARQ feedback in accordance with at least some embodiments of the present invention. The sequences are described using the example scenario described with FIG. 5.

Referring to FIG. 9, phase 902 comprises UE1 transmits an SCI for configuring a groupcast. The SCI may comprise information indicating SL groupcast HARQ feedback option 1 and periodic resources for the HARQ feedback. The SCI may be received at UE-2, UE-3 and UE-n. Phase 904 comprises the UE-n determining to request to the UE-1 for destination identifiers of at least one peer UE of the UEs of the groupcast group, i.e. in this example UE-2 and UE-3. Examples of the destination identifiers comprise at least layer 2 identifiers (L2 IDs) of the UEs.

Phase 906 comprises the UE-n transmitting to the UE-1 a request, UEDestIDRequest, for the destination identifiers of at least one, more than one or even all, peer UEs of the groupcast group. Phase 908 comprises the UE-1 selecting at least one peer UE and transmitting a destination identifier of the selected at least one peer UE to the UE-n included in a response, UEDestIDResponse. In the example described with FIG. 9, the UE-2 is selected by UE-1 and the destination identifier of UE-2 is transmitted to the UE-n. In this way configuring modified HARQ feedback to the UE-2 may be facilitated.

Phase 910 comprises the UE-n establishing a unicast link between the UE-n and the UE-2. The unicast link may be established based on the destination identifier received in the response in phase 908. It should be noted that phase 910 may be omitted if the unicast link has already been established. Establishing the unicast link is a pre-emptive measure for sending the request to modify HARQ feedback.

Phase 912 comprises the UE-n transmitting a request to modify HARQ feedback, SidelinkFakeHARQRequest message, over the SL established in phase 910, to the UE-2. The request in phase 912 may be transmitted based on the UE-n determining at least one trigger 911 for requesting to modify HARQ feedback. Phase 914 comprises the UE-2 transmitting a response, SidelinkFakeHARQResponse message, to the SidelinkFakeHARQRequest message.

Examples of triggers 911 for transmitting a SidelinkFakeHARQRequest may be:

SL RSRP measured at UE-n falls below a predefined threshold RSRP_SidelinkFakeHARQRequest i.e. UE-n failed in decoding SCI.

Rate of change of radio parameters, e.g. a SL RSRP measured at UE-n falls rapidly over a predefined period of time, RSRPRateOfChange_SidelinkFakeHARQRequest.

UE-n can successfully decode the $1^{st}$ stage SCI but is not able to decode the $2^{nd}$ stage SCI (Note: $1^{st}$ stage SCI is transmitted robustly over PSCCH while $2^{nd}$ stage SCI is multiplexed (and thus less robust) with SL data in PSSCH).

Range between TX-UE and RX-UE (UE-n in this example), e.g. distance between TX-UE and RX-UE has increased beyond a predefined threshold range_SidelinkFakeHARQRequest.

Number of received consecutive retransmissions (ReTXs) sent by the TX-UE numNACKs_SidelinkFakeHARQRequest, i.e. RX-UE has already experienced partial problems in decoding a groupcast transmission.

Based on logical channel priority LCP_SidelinkFakeHARQRequest, e.g. only for high priority (=low LCP value) transmissions.

Set by higher layer, i.e. decision is done on V2X layer based on service requirements or other higher layer parameters.

Predicated overlapping/colliding communication activities between receiving the periodic transmission from UE-1 and other transmission/reception task(s), e.g. which would cause half-duplex issue.

Phase 916 comprises the UE-1 transmitting a groupcast. The groupcast may comprise a groupcast transmission that is not successfully received by the UE-n. The groupcast transmission may be a SL transmission on a PSCCH. The SL transmission may comprise SCI. The SCI may comprise a $1^{st}$ stage that is transmitted robustly over PSCCH and a $2^{nd}$ stage that is transmitted less robustly by multiplexing the SCI with SL data.

In phase 918, the UE-n fails to successfully receive the groupcast. It should be noted that although the UE-n may not successfully receive the whole groupcast transmission, the UE-n may successfully receive a part of the groupcast transmission. For example, the UE-n may successfully receive the $1^{st}$ stage of SCI, but reception of the $2^{nd}$ stage of the SCI may be unsuccessful.

Phase 920 comprises the UE-2 transmitting a modified HARQ feedback, i.e. a modified HARQ, to the UE-1. Optionally, the UE-n may monitor a resource, where the HARQ feedback should be transmitted. The resource for the HARQ feedback many be determined based on the control information for the groupcast, e.g. the 1st stage of SCI, provided the UE-n has received the $1^{st}$ stage of SCI and monitoring is enabled at the UE-n.

Phase 922 comprises the UE-1 transmitting retransmission(s) of the groupcast based on, or triggered, by the modified HARQ feedback in phase 920. In this way the UE-n may receive the retransmission(s) even if HARQ feedback from the UE-n would not be received at the UE-1.

Phase 924 comprises the UE-n disabling transmissions of modified HARQ feedback. In this way transmissions of modified HARQ feedback by the RX-UE, in this case UE-2, may be ended. The UE may determine to disable the transmissions of modified HARQ feedback based on determining 923 that a need for modified HARQ feedback has been removed, for example based on the UE-n deciding to take over its own HARQ feedback transmission, when a radio condition from UE-1 is sufficient or has improved. In an example, the disabling may comprise the UE-n transmitting a SidelinkFakeHARQRequest message with sl-FakeNACK-rxx=disabled to UE that have accepted the SidelinkFakeHARQRequest message. In this way the UE-n decides to take over its own HARQ feedback transmission task by itself, when the radio condition from UE-1 is getting good.

Referring to FIG. 10, as a difference to the sequence in FIG. 9, the UE-n requests more than one UE of the groupcast group to modify HARQ feedback and only a part of the UE accept the request to modify HARQ feedback. After phase 904, in phase 1002, the UE-n may transmit a request, UEDestIDRequest, for the destination identifiers of at least one, more than one or even all, peer UEs of the groupcast group. Phase 1004 comprises, UE-1, in response to the request in phase 1002, selecting, in phase 1004, more than one or even all, UEs of the groupcast group and transmitting a response, UEDestIDResponse, comprising the selected destination identifiers to the UE-n. In this example, the response to the UE-n comprises the identifiers of UE-2 and UE-3. In this way configuring modified HARQ feedback to more than one UE of the groupcast group may be facilitated.

Phase 1006 comprises the UE-n establishing a unicast SL between the UE-n and the UE-2. The unicast SL may be stablished based on the destination identifier received in the response in phase 1004. It should be noted that phase 1006 may be omitted if the unicast SL has already been established.

Phase 1008 comprises the UE-n establishing a unicast SL between the UE-n and the UE-3. The unicast SL may be stablished based on the destination identifier received in the response in phase 1004. It should be noted that phase 1008 may be omitted if the unicast SL has already been established.

Phase 1010 comprises the UE-n transmitting a request to modify HARQ feedback, SidelinkFakeHARQRequest message, over the unicast SL established in phase 1006, to the UE-2. The request in phase 1010 may be transmitted based on the UE-n determining at least one trigger 911 for transmitting a SidelinkFakeHARQRequest. Phase 1012 comprises the UE-2 transmitting a response, SidelinkFakeHARQResponse message, to the SidelinkFakeHARQRequest message.

Phase 1014 comprises the UE-n transmitting a request to modify HARQ feedback, SidelinkFakeHARQRequest message, over the unicast SL established in phase 1008, to the UE-3. The request in phase 1014 may be transmitted based on the UE-n determining at least one trigger 911 for transmitting a SidelinkFakeHARQRequest. Phase 1016 comprises the UE-3 transmitting a response, SidelinkFakeHARQResponse message, to the SidelinkFakeHARQRequest message.

In an example, in phase 1012 the UE-2 accepts the SidelinkFakeHARQRequest message form the UE-n, but in phase 1016 the UE-3 rejects the SidelinkFakeHARQRequest message from UE-n. It should be noted that since the UE-3 rejected the SidelinkFakeHARQRequest message, the UE-n may select another UE, if available, of the groupcast group and transmit the SidelinkFakeHARQRequest message to another UE.

It should be noted that if at least one of the UE to which the SidelinkFakeHARQRequest message has been transmitted has accepted the request, further transmissions of SidelinkFakeHARQRequest message to other UE may not be necessary, since the transmissions of modified HARQ feedback are already provided by the one UE that accepted the SidelinkFakeHARQRequest message.

Referring to FIG. 11, as a difference to the sequence in FIG. 9, the UE-n requests all UEs of the groupcast to modify HARQ feedback over a groupcast SL. In phase 1102, the UE-n may transmit a request, UEDestIDRequest message, for the destination identifiers of at least one, more than one or even all, peer UEs of the groupcast group. Phase 1104 comprises, UE-1, in response to the request in phase 1102, selecting, in phase 1104, all UEs of the groupcast group and transmitting a response, UEDestIDResponse message, comprising the selected destination identifiers to the UE-n. In this way configuring modified HARQ feedback to all of the UEs of the groupcast may be facilitated. Phase 1106 comprises the UE-n transmitting a request to modify HARQ feedback, SidelinkFakeHARQRequest message, to all UE of the groupcast group. The request may be groupcast to the UE based on UE identifiers received in phase 1104. Then after phase 918, in phase 1108, all the UEs of the groupcast group transmit modified HARQ feedback to the UE-1. In phase 1110 the UE-n may disable transmissions of modified HARQ feedback. The UE may determine to disable the transmissions of modified HARQ feedback based on determining that a need for modified HARQ feedback has been removed, for example based on the UE-n deciding to take over its own HARQ feedback transmission, when a radio condition from UE-1 is sufficient or has improved and/or overlapping/colliding communication activity has been resolved. In an example, the disabling may comprise the UE-n transmitting a SidelinkFakeHARQRequest message over groupcast with sl-FakeNACK-rxx=disabled. In this way the UE-n decides to take over its own HARQ feedback transmission task by itself, when the radio condition from UE1 is getting good.

In an example, in phases 906, 1002, 1102, the UE-n may be triggered to transmit the UEDestIDRequest for establishing a unicast link, based on:

radio measurements, e.g. RSRP measured on (Sidelink) Channel State Information Reference Signal (CSI-RS), observed Signal-to-interference-plus-noise ratio (SINR), predicted overlapping/colliding communication activities, observed success ratio of decoded PSSCH transmission, or other communication issues identified by higher layers radio conditions, i.e. if observed SL RSRP (at UE-n from UE-1) falls below a preconfigured threshold RSRP_establishPreemptivePC5 range between TX-UE and RX-UE, i.e. of distance between TX-UE and RX-UE increase beyond a predefined threshold range_establishPreemptivePC5 number of consecutive retransmission requests (NACKs) sent by the RX-UE numNACKs_establishPreemptivePC5, i.e. RX-UE has already experienced partial problems in decoding SL groupcast transmission logical channel priority LCP_establishPreemptivePC5, i.e. only for high priority (=low LCP value) transmissions a setting by higher layer, i.e. decision is done on V2X layer based on service requirements or other higher layer parameters predicated overlapping/colliding communication activities between receiving the periodic transmission from UE-1 and other transmission/reception task(s), e.g. which would cause half-duplex issue. It is noted that UE-n can predict the periodic groupcast from UE1 by receiving and decoding the SCI. Thus, it can predict the future resources used by UE1 for the considered groupcast and, thus, to further predict when a collision may happen.

It should be noted that irrespective of any condition described above, i.e. regardless of any actual parameters, the RX-UE, in his case the UE-n, may anyway request a destination identifier of at least one of its peer RX UE(s).

It should be noted that in phases 906, 1002, 1102 the request message UEDestIDRequest sent by UE-n to the TX UE is to enquire about the destination L2 ID(s) of at least one peer group member. In one embodiment the TX-UE selects (at least one of) the most appropriate peer RX-UE (in the example in FIG. 9, that's UE-2) for the requesting RX-UE (UE-n) and sends the corresponding L2 ID in the UEDestIDResponse message. However, in the examples of phases 1004 and 1104 the UEDestIDResponse message may comprise up to all RX-UE identifiers of the groupcast group or a subset therein, so that it's up to UE-n to select the most appropriate peer RX-UE.

It should be noted that transmitting the UEDestIDRequest in phases 906, 1002, 1102 may be optional. For example, the UE-n may have established a PC5 connection with another group member UE, e.g. UE-2 or UE-3, which means the UE-n may already know the L2 ID used by that group member. In addition, the UE-n may receive and determine the source ID of the group members groupcasting to the same group destination ID, which can be used by UE-n as the L2 destination ID of the peer UE.

In an example of phases 912, 1010, 1014 and 1106, when the UE-n has the L2 ID of at least one RX-UE, e.g. UE-2 or UE-3, of the groupcast group, and the RX-UE is within a communication range from the UE-n, the UE-n may establish at least one PC5 unicast link to the RX-UE. Establishing the PC5 unicast link facilitates the UE-n to later on to transmit the SidelinkFakeHARQRequest message to (at least one of) over the established PC5 unicast link. It should be noted that the UE-n may establish PC5 unicast links to one or more further RX-UEs. In a further example, if there is already a PC5 connection between UE-n and the peer RX UE, this step can be omitted. In another embodiment, depending on how the SidelinkFakeHARQRequest message is transmitted to the peer RX UE, such a PC5 connection may also not be needed.

In an example, after at least one peer RX-UE has accepted the SidelinkFakeHARQRequest transmitted in phases 912, 1010, 1014 and 1106, if the TX-UE, in this case UE-1, transmits a next groupcast transmission, the RX-UE that has accepted the SidelinkFakeHARQRequest transmits a modified HARQ feedback. In this way, reception problems at the UE-n may be indicated to the TX-UE with the help of the modified HARQ feedback from the peer RX-UE(s).

In an example, in phase 920 and 1108, the RX-UE(s) within the same groupcast group with the UE-n transmit modified HARQ feedback on behalf of the UE-n thereby mimicking the behavior of UE-n, when the UE-n has not successfully received the groupcast. Moreover, the HARQ feedback from the RX-UE(s) may be modified even if the UE-n would have successfully received the groupcast and/or the UE-n is transmitting HARQ feedback according to groupcast control information, e.g. SCI. Therefore, the modified HARQ feedback from the RX-UE(s) may provide the RX-UE(s) to impersonate the HARQ feedback from UE-n. The TX UE receives the HARQ feedback from the RX-UE(s) of the groupcast group and the TX UE may take one or more actions to facilitate reception of the groupcast transmission or retransmissions of the groupcast transmission by the UE-n. Examples of the actions comprise HARQ retransmissions, increasing transmission power, range adaption for group members of the groupcast group, group member reselection etc.

In an alternative embodiment, phases 924 and 1110, comprises disabling, by the RX-UE, in this example the UE-n, transmissions of the modified HARQ feedback, based at least on an expiry of a timer for modified HARQ feedbacks, a number of modified HARQ feedbacks and/or improved radio conditions between the transmitter wireless device and the receiver wireless device. In an example, it may be determined that the number of modified HARQ feedbacks have been reached and/or the timer has expired, or the radio conditions have improved, whereby transmissions of the modified HARQ feedback may be disabled. If one or more of the conditions are determined by the UE-n, the UE-n may transmit a request, SidelinkFakeHARQRequest, to the peer UE-RX(s) to disable transmissions of modified HARQ feedback. It should be noted that the UE-n may monitor transmissions of modified HARQ feedback provided the UE-n has received the $1^{st}$ stage of SCI, where the number of modified HARQ feedbacks may be determined. On the other hand, it should be noted that if a peer RX-UE that has accepted to transmit modified HARQ feedback determines that the number of modified HARQ feedbacks have been reached and/or the timer has expired, the peer RX-UE may disable transmissions of modified HARQ feedback without a request in that regard from the UE-n. Alternatively or additionally, the peer RX-UE that has accepted to transmit modified HARQ feedback, may disable transmissions of modified HARQ feedback based on a SidelinkFakeHARQRequest indicating disabling, e.g. based on sl-FakeNACK-rxx, of the transmissions of modified HARQ feedback. After transmissions of modified HARQ feedback have been disabled, the HARQ feedback may be transmitted in accordance with control information of the groupcast, e.g. SCI, without modifying HARQ feedback.

Figures 12, 13:
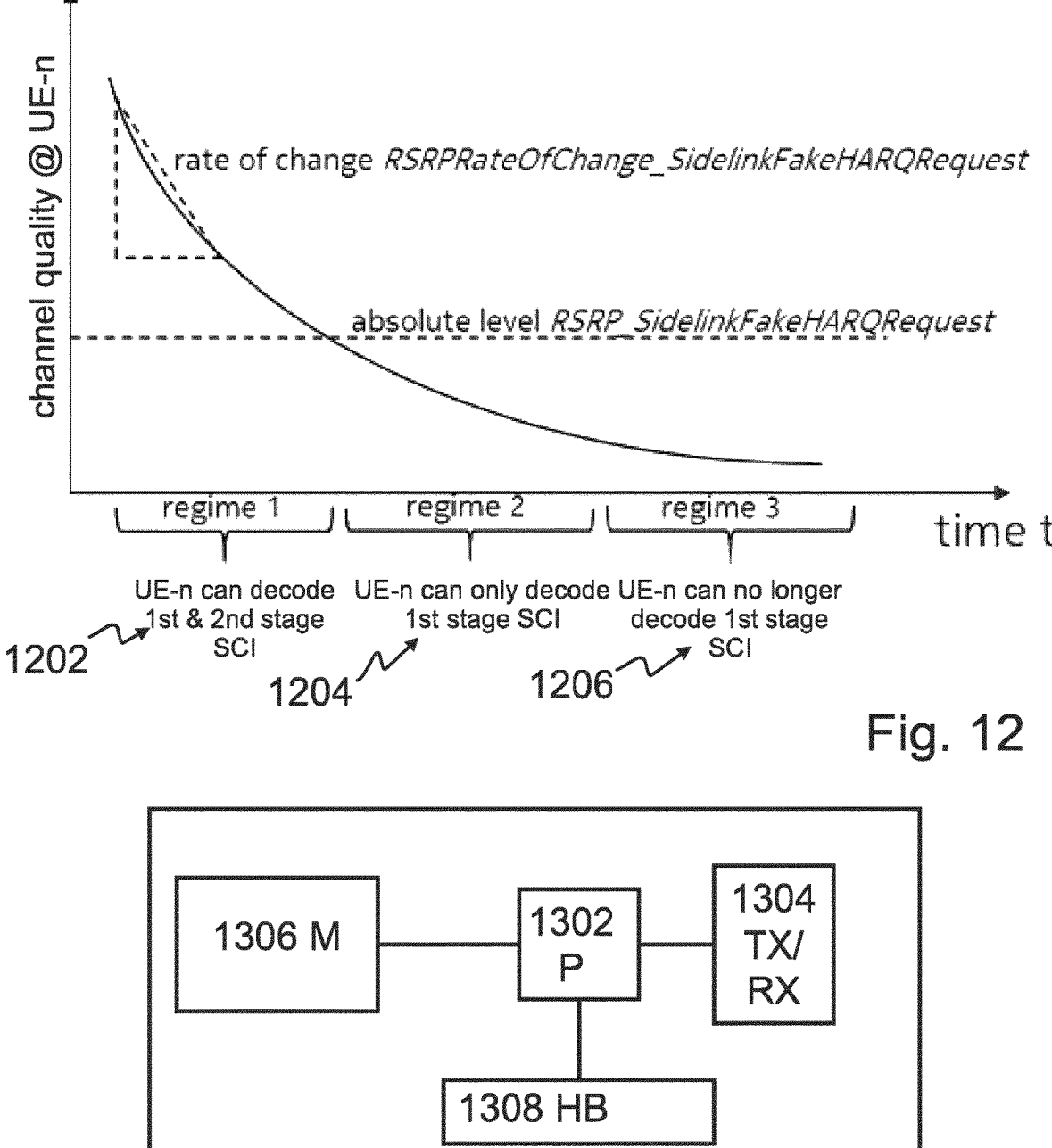
FIG. 12 illustrates examples of triggers for requesting to
transmit modified HARQ feedback in accordance with at
least some embodiments of the present invention.
FIG. 13 illustrates an example of a block diagram of an
apparatus in accordance with at least some embodiments of
the present invention.

FIG. 12 illustrates examples of triggers for requesting to transmit modified HARQ feedback in accordance with at least some embodiments of the present invention. The example is now described with reference to the scenario described with FIG. 5. The requesting to modify HARQ feedback, or requesting to transmit modified HARQ feedback, may be triggered based on channel quality at UE-n. The channel quality at UE-n may comprise one or more regimes. The operation of the UE-n may depend on at which regime the channel quality at the UE-n is. When the channel quality at the UE-n falls within a regime, the UE-n may be triggered to transmit SidelinkFakeHARQRequest message over groupcast to one or more peer RX-UEs. In an example, three regimes may be defined based on successfully decoding of the whole SCI (regime 1), decoding a part of the SCI successfully (regime 2) and failing to decode the SCI from the UE-1, i.e. the TX-UE:

In regime 1 1202 the radio conditions at UE-n start to deteriorate but are still good enough to decode the full SCI (both $1^{st}$ & $2^{nd}$ stage SCI) and hence UE-n could in principle also send the HARQ feedback on its own. If the trigger to send the SidelinkFakeHARQRequest is met in regime 1, e.g. because the rate of change of the channel quality is large, the HARQ feedback may be sent by the UE-n and UE-2 (or any other UE that has accepted the SidelinkFakeHARQRequest message from the UE-n) regarding the same groupcast transmission. Accordingly, the UE-n may transmit HARQ feedback because the radio conditions are sufficient that the UE-n may decode $1^{st}$ and $2^{nd}$ stage SCI and thus the UE-n knows on which resource to send HARQ feedback, while UE-2 is requested by UE-n to modify its HARQ feedback on the same PSFCH resource (HARQ feedback option 1).

In regime 2 1204 UE-n can only decode $1^{st}$ stage SCI and thus strictly needs the help of UE-2 (upon SidelinkFakeHARQRequest) in order to provide feedback to TX-UE. In regime 2 only the requested UE-2 may send HARQ feedback to TX-UE.

In regime 3 1204 the radio conditions at UE-n are so worse that retransmission from TX-UE (due to provided NACKs) will no longer help UE-n and UE-n may decide to stop requesting UE-2 to send modified NACKs (as the ReTXs do not help UE-n any longer).

FIG. 13 illustrates an example of an apparatus in accordance with at least some embodiments of the present invention. The apparatus may be a wireless device or UE, or a part of a wireless device or UE.

The apparatus comprises a processor 1302 and a transceiver 1304. The processor is operatively connected to the transceiver for controlling the transceiver. The apparatus may comprise a memory 1306. The memory may be operatively connected to the processor. It should be appreciated that the memory may be a separate memory or included to the processor and/or the transceiver.

In an example, the apparatus comprises a groupcast HARQ block (HB) 1308 connected operatively to the processor. The HB may be configured to perform one or more functionalities described in an example described herein, comprising modifying HARQ feedback, reversing HARQ feedback, determining one or more triggers for requesting to modify HARQ feedback, monitoring HARQ feedback, (re-) selecting wireless devices for modifying HARQ feedback, disabling modifying HARQ feedback and/or generating requests for modifying HARQ feedback. Based on the functionalities of the HB, the processor may control the transceiver to transmit and/or receive information, for example groupcasts, HARQ feedbacks, requests and/or responses, in accordance with one or more functionalities described in an example described herein.

According to an embodiment, the processor is configured to control the transceiver and/or to perform one or more functionalities described with a method according to an embodiment.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, program instructions, instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a wireless network, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:

(a) hardware-only circuit implementations (such as implementations in only analogue and/or digital circuitry) and (b) combinations of hardware circuits and software, such as (as applicable):

(i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention.

However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

What is claimed is:

1. A method comprising:

receiving, by a receiver wireless device, a groupcast, from a transmitter wireless device of the groupcast;

determining, by the receiver wireless device, at least one trigger for requesting one or more peer receiver wireless devices of the groupcast to modify a Hybrid Automatic Repeat Request (HARQ) feedback to the groupcast;

transmitting, by the receiver wireless device, based on the at least one trigger determined, at least one request to the one or more peer receiver wireless devices to transmit a modified HARQ feedback to the transmitter wireless device of the groupcast, wherein the at least one request-comprises information elements for configuring the modified HARQ feedback, the information elements comprising:

a number of consecutive transmissions of the modified HARQ feedback, sl-NrofFakeNACKs-rxx;

a maximum number of accumulated transmissions of the modified HARQ feedback desired, sl-MaxTotal-NrofFakeNACKs-rXX;

a threshold for logical channel priority, sl-FakeNACK-priority-rxx;

a flag for disabling or enabling the modified HARQ feedback, sl-FakeNACK-rxx;

one or more link identifiers for transmitting the modified HARQ feedback, sl-FakeNACKLinkIDList; and one or more identifiers of the one or more peer receiver wireless devices for the at least one request to transmit the modified HARQ feedback, sl-FakeN-ACKpeerUEIDList;

monitoring, by the receiver wireless device, the modified HARQ feedback transmitted by the one or more peer receiver wireless devices that have accepted to transmit the modified HARQ feedback;

based on the monitoring, determining, by the receiver wireless device, that the modified HARQ feedback is transmitted by a peer receiver wireless device of the one or more peer receiver wireless devices that have accepted to transmit the modified HARQ feedback;

reselecting, by the receiver wireless device, in response to determining that the modified HARQ feedback was not transmitted, one or more further peer receiver wireless devices of the groupcast for transmitting the modified HARQ feedback; and disabling, by the receiver wireless device, transmissions of the modified HARQ feedback, based at least on:

an expiry of a timer for the modified HARQ feedback, a number of transmitted modified HARQ feedbacks reaching a limit defined by at least one of the number of consecutive transmissions of the modified HARQ feedback or the maximum number of accumulated transmissions of the modified HARQ feedback, and improved radio conditions between the transmitter wireless device and the receiver wireless device.

2. The method of claim 1, further comprising:

monitoring, by the receiver wireless device, one or more triggers for requesting the one or more peer receiver wireless devices of the groupcast to modify the HARQ feedback; and transmitting, by the receiver wireless device, the at least one request to the one or more peer receiver wireless devices to transmit the modified HARQ feedback to the transmitter wireless device of the groupcast based on detecting the at least one trigger of the one or more triggers.

3. The method of claim 2, further comprising:

receiving, by the receiver wireless device, one or more responses to the at least one request, the one or more responses indicating acceptance to transmit the modified HARQ feedback.

4. The method of claim 3, wherein the groupcast is sidelink communications.

5. The method of claim 4, wherein the at least one request to modify the HARQ feedback to the groupcast is a sidelink broadcast message, a sidelink groupcast message or a sidelink unicast message.

6. The method of claim 5, wherein the HARQ feedback is NACK-only feedback.

7. The method of claim 6, wherein the at least one request is a sidelink radio resource Control (RRC) protocol message or a sidelink Medium Access Control protocol (MAC) Control Element (CE).

8. An apparatus comprising:

a processor; and a memory comprising computer-executable instructions that, when executed by the processor, cause the apparatus to perform the following operations:

receiving a groupcast from a transmitter wireless device of the groupcast;

determining at least one trigger for requesting one or more peer receiver wireless devices of the groupcast to modify a Hybrid Automatic Repeat Request (HARQ) feedback to the groupcast;

transmitting, based on the at least one trigger determined, at least one request to the one or more peer receiver wireless devices to transmit a modified HARQ feedback to the transmitter wireless device of the groupcast, wherein the at least one request comprises information elements for configuring the modified HARQ feedback, the information elements comprising:

a number of consecutive transmissions of the modified HARQ feedback, sl-NrofFakeNACKs-rxx;

a maximum number of accumulated transmissions of the modified HARQ feedback desired, sl-MaxTo-talNrofFakeNACKs-rXX;

a threshold for logical channel priority, sl-FakeN-ACKpriority-rxx;

a flag for disabling or enabling the modified HARQ feedback, sl-FakeNACK-rxx;

one or more link identifiers for transmitting the modified HARQ feedback, sl-FakeNACK-LinkIDList; and one or more identifiers of the one or more peer receiver wireless devices for the at least one request to the modified HARQ feedback, sl-Fak-eNACKpeerUEIDList;

monitoring the modified HARQ feedback transmitted by the one or more peer receiver wireless devices that have accepted to transmit the modified HARQ feedback;

based on the monitoring, determining, that the modified HARQ feedback is transmitted by a peer receiver wireless device of the one or more peer receiver wireless devices that have accepted to transmit the modified HARQ feedback;

reselecting, in response to determining that the modified HARQ feedback was not transmitted, one or more further peer receiver wireless devices of the groupcast for transmitting the modified HARQ feedback; and disabling transmissions of the modified HARQ feedback, based at least on:

an expiry of a timer for the modified HARQ feedback, a number of transmitted modified HARQ feedbacks reaching a limit defined by at least one of the number of consecutive transmissions of the modified HARQ feedback or the maximum number of accumulated transmissions of the modified HARQ feedback, and improved radio conditions between the transmitter wireless device and a receiver wireless device.

9. The apparatus of claim 8, wherein the computer-executable instructions, when executed by the processor, further cause the apparatus to perform the following operations:

monitoring one or more triggers for requesting the one or more peer receiver wireless devices of the groupcast to modify the HARQ feedback; and transmitting the at least one request to the one or more peer receiver wireless devices to transmit the modified HARQ feedback to the transmitter wireless device of the groupcast based on detecting the at least one trigger of the one or more triggers.

10. The apparatus of claim 9, wherein the computer-executable instructions, when executed by the processor, further cause the apparatus to perform the following operations:

receiving one or more responses to the at least one request, the one or more responses indicating acceptance to transmit the modified HARQ feedback.

11. The apparatus of claim 10, wherein the groupcast is sidelink communications.

12. The apparatus of claim 11, wherein the at least one request to modify the HARQ feedback to the groupcast is a sidelink broadcast message, a sidelink groupcast message or a sidelink unicast message.

13. The apparatus of claim 12, wherein the HARQ feedback is NACK-only feedback.

14. The apparatus of claim 13, wherein the at least one request is a sidelink radio resource Control (RRC) protocol message or a sidelink Medium Access Control protocol (MAC) Control Element (CE).

15. A system comprising:

an apparatus;

a processor; and a memory comprising computer-executable instructions that, when executed by the processor, cause the apparatus to perform the following operations:

receiving a groupcast from a transmitter wireless device of the groupcast;

determining at least one trigger for requesting one or more peer receiver wireless devices of the groupcast to modify a Hybrid Automatic Repeat Request (HARQ) feedback to the groupcast;

transmitting, based on the at least one trigger determined, at least one request to the one or more peer receiver wireless devices to transmit a modified HARQ feedback to the transmitter wireless device of the groupcast, wherein the at least one request comprises information elements for configuring the modified HARQ feedback, the information elements comprising:

a number of consecutive transmissions of the modified HARQ feedback, sl-NrofFakeNACKs-rxx;

a maximum number of accumulated transmissions of the modified HARQ feedback desired, sl-MaxTotalNrofFakeNACKs-rXX;

a threshold for logical channel priority, sl-FakeNACKpriority-rxx;

a flag for disabling or enabling the modified HARQ feedback, sl-FakeNACK-rxx;

one or more link identifiers for transmitting the modified HARQ feedback, sl-FakeNACK-LinkIDList; and one or more identifiers of the one or more peer receiver wireless devices for the at least one request to the modified HARQ feedback, sl-FakeNACKpeerUEIDList;

monitoring the modified HARQ feedback transmitted by the one or more peer receiver wireless devices that have accepted to transmit the modified HARQ feedback;

based on the monitoring, determining, that the modified HARQ feedback is transmitted by a peer receiver wireless device of the one or more peer receiver wireless devices that have accepted to transmit the modified HARQ feedback;

reselecting, in response to determining that the modified HARQ feedback was not transmitted, one or more further peer receiver wireless devices of the groupcast for transmitting the modified HARQ feedback; and disabling transmissions of the modified HARQ feedback, based at least on:

an expiry of a timer for the modified HARQ feedback, a number of transmitted modified HARQ feedbacks reaching a limit defined by at least one of the number of consecutive transmissions of the modified HARQ feedback or the maximum number of accumulated transmissions of the modified HARQ feedback, and improved radio conditions between the transmitter wireless device and a receiver wireless device.

16. The system of claim 15, wherein the computer-executable instructions, when executed by the processor, further cause the apparatus to perform the following operations:

monitoring one or more triggers for requesting the one or more peer receiver wireless devices of the groupcast to modify the HARQ feedback; and transmitting the at least one request to the one or more peer receiver wireless devices to transmit the modified HARQ feedback to the transmitter wireless device of the groupcast based on detecting the at least one trigger of the one or more triggers.

17. The system of claim 16, wherein the computer-executable instructions, when executed by the processor, further cause the apparatus to perform the following operations:

receiving one or more responses to the at least one request, the one or more responses indicating acceptance to transmit the modified HARQ feedback.

18. The system of claim 17, wherein the groupcast is sidelink communications.

19. The system of claim 18, wherein the at least one request to modify the HARQ feedback to the groupcast is a sidelink broadcast message, a sidelink groupcast message or a sidelink unicast message.

20. The apparatus of claim 19, wherein the HARQ feedback is NACK-only feedback; and wherein the at least one request is a sidelink radio resource Control (RRC) protocol message or a sidelink Medium Access Control protocol (MAC) Control Element (CE).

* * * * *